United States Patent [19]
Kato et al.

[11] Patent Number: 5,648,951
[45] Date of Patent: Jul. 15, 1997

[54] MOVABLE OPTICAL HEAD INTEGRALLY INCORPORATED WITH OBJECTIVE LENS AND HOLOGRAM ELEMENT

[75] Inventors: Makoto Kato, Nishinomiya; Yoshiaki Komma, Kyoto; Shin-ichi Kadowaki, Hirakata; Yoshikazu Hori, Kobe; Seiji Nishino, Osaka; Tetsuo Saimi, Hirakata, all of Japan

[73] Assignee: Matsushita Electric Industrial Co. Ltd., Osaka, Japan

[21] Appl. No.: 415,764

[22] Filed: Apr. 3, 1995

Related U.S. Application Data

[63] Continuation of Ser. No. 158,368, Nov. 29, 1993, abandoned, which is a continuation of Ser. No. 681,928, Apr. 8, 1991, abandoned.

[30] Foreign Application Priority Data

Apr. 12, 1990 [JP] Japan ................... 2-097164
Jun. 19, 1990 [JP] Japan ................... 2-161760
Sep. 4, 1990 [JP] Japan ................... 2-234879

[51] Int. Cl.⁶ ............................................. G11B 7/00
[52] U.S. Cl. ................. 369/112; 369/44.12; 369/109
[58] Field of Search ................... 369/44.11, 44.12, 369/44.23, 44.24, 109, 111, 112, 110, 103, 118; 359/566, 569, 571

[56] References Cited

U.S. PATENT DOCUMENTS

| | | | |
|---|---|---|---|
| 4,731,772 | 3/1988 | Lee | 369/112 |
| 4,757,197 | 7/1988 | Lee | 250/239 |
| 4,876,680 | 10/1989 | Misawa et al. | 369/112 |
| 4,929,823 | 5/1990 | Kato et al. | 369/112 |
| 4,945,529 | 7/1990 | Uno et al. | 369/44.12 |
| 4,983,017 | 1/1991 | Tsuji et al. | 369/44.11 |

(List continued on next page.)

FOREIGN PATENT DOCUMENTS

| | | |
|---|---|---|
| 0222238 | 5/1987 | European Pat. Off. . |
| 0324518 | 7/1989 | European Pat. Off. . |
| 0346121 | 12/1989 | European Pat. Off. . |
| 60-182526 | 9/1985 | Japan . |
| 62-97144 | 5/1987 | Japan ........... 369/44.23 |
| 155746 | 3/1989 | Japan . |
| 162838 | 3/1989 | Japan . |
| 6462838 | 3/1989 | Japan . |
| 1118224 | 5/1989 | Japan . |
| 281335 | 3/1990 | Japan . |

*Primary Examiner*—Nabil Hindi
*Attorney, Agent, or Firm*—Watson Cole Stevens Davis, P.L.L.C.

[57] ABSTRACT

Disclosed is a compact optical pick-up head apparatus suitable for mass-production, which comprises a light radiation source, an element composed of photodetector split into a plurality of regions and integrated on the same base, an objective lens for focusing a beam from the above source on an optical disk, a blazed hologram integrated to the support member of the lens, a means for driving the support member to which the objective lens and blazed hologram are integrated in response to an output as servo signal output from the photodetector which receives a diffracted beam produced in such a manner that a return beam reflected or diffracted by the optical disk is incident on the objective lens integrated with the above hologram. The optical pickup apparatus according to the present invention employs a region-split-type phase hologram in which a pair of Flesnel zone plate-like patterns, by which a plurality of diffraction wavefronts having a different focus and the same diffraction order are produced outside an optical-axis, are non-superimposedly formed. The above hologram can be blazed with a pinpoint accuracy by lithography using a few mask patterns synthesized by a computer, and further a more preferably blazing can be realized by the combination of the ion beam etching and the lithography. Accordingly, not only noise caused by an unnecessary diffracted beam component but also the offset of a servo signal can be restrained and the size of the objective lens can be reduced by the integration of the entire optical system, which greatly contributes to the superminiaturization of an optical head.

16 Claims, 19 Drawing Sheets

U.S. PATENT DOCUMENTS

| | | | |
|---|---|---|---|
| 5,065,380 | 11/1991 | Yokota | 369/44.12 |
| 5,111,448 | 5/1992 | Komma et al. | 369/44.23 |
| 5,111,449 | 5/1992 | Kurata et al. | 359/571 |
| 5,161,135 | 11/1992 | Inoue et al. | 369/44.23 |
| 5,161,148 | 11/1992 | Hori et al. | 369/44.23 |
| 5,293,367 | 3/1994 | Kadowaki et al. | 365/44.12 |

FIG. I(a)
PRIOR ART
FIG. I(b)
PRIOR ART
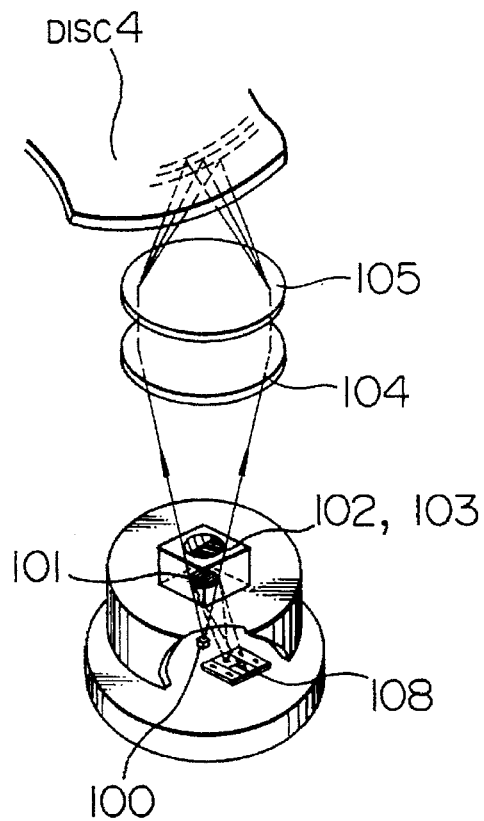
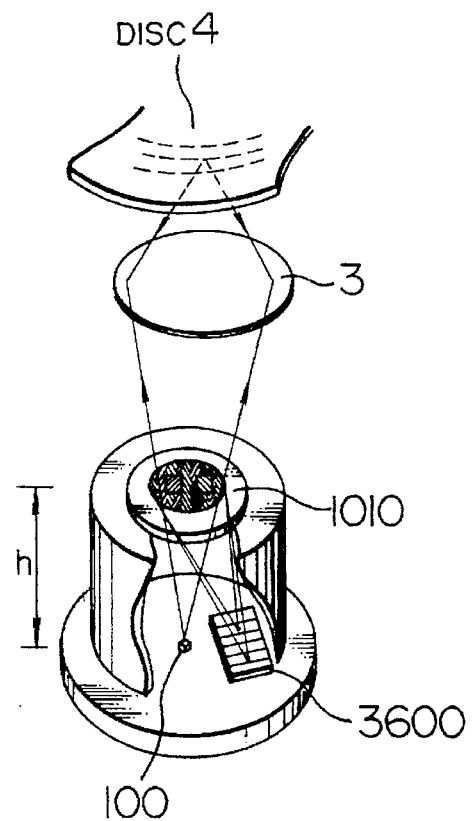

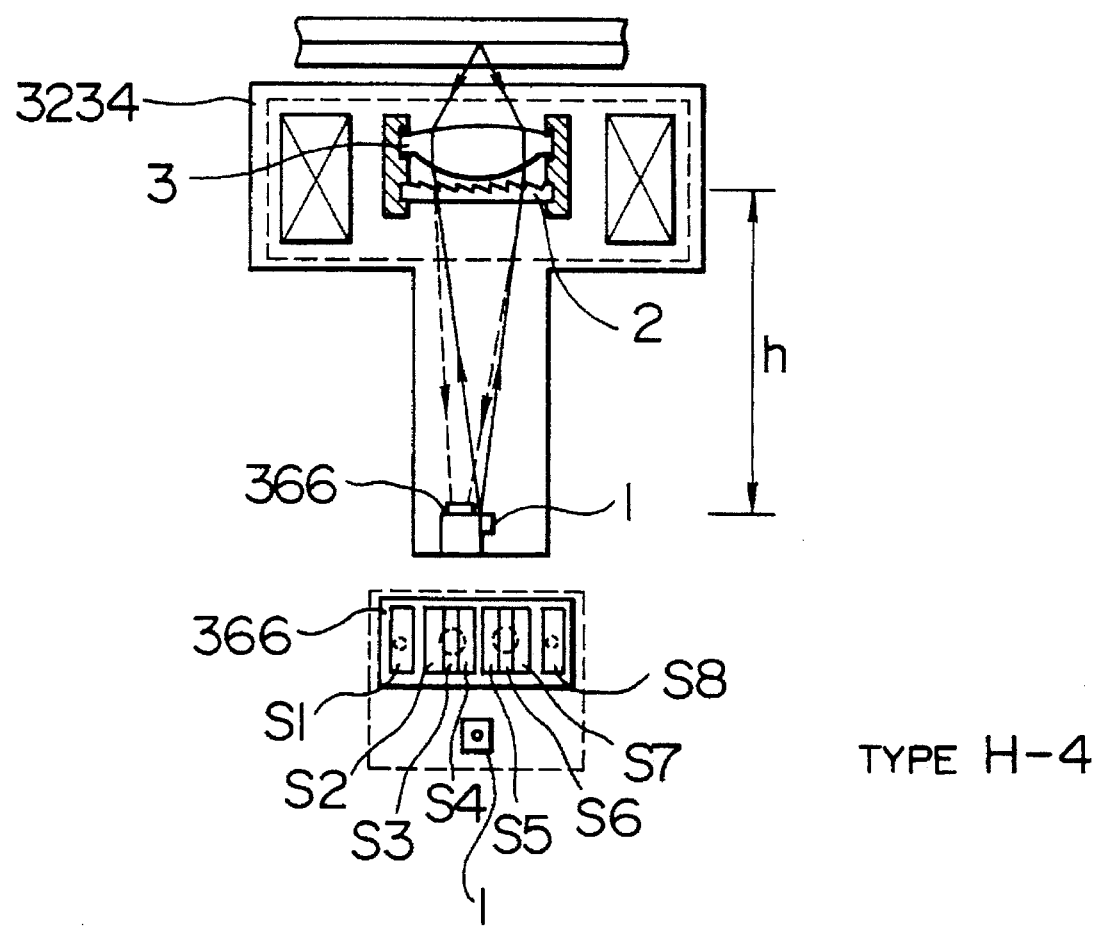

DEPTH IN THE 2ND ETCHING $\phi$

3000a···
3010a···

MOVABLE OPTICAL HEAD INTEGRALLY INCORPORATED WITH OBJECTIVE LENS AND HOLOGRAM ELEMENT

This application is a continuation of application Ser. No. 08/158,368 filed Nov. 29, 1993 (abandoned) which is a continuation of application Ser. No. 07/681,928, filed Apr. 8, 1991 (abandoned).

BACKGROUND OF THE INVENTION

The present invention relates to an optical head apparatus for recording and reproducing optical data recorded on an optical memory medium such as an optical disk, optical card and the like, a magnet-optic recording medium and the like.

An optical memory technology, which can develop a pit-shaped pattern in correspondence to signals in time series, has been practically used as a memory medium of high density and large capacity with the fields of application thereof extended from a digital audio disk to a data file.

The optical memory technology starts from the development of a memory medium and is completed by the development of an optical head apparatus. In particular, the reduction in size and cost and the improvement of performance and reliability of the optical head apparatus is indispensable to the spread of the optical memory technology and an optical head apparatus having an integrated source and photodetecting system as well as integrated electronic circuits has been developed.

FIGS. 1(a) and 1(b) show two examples of the optical system of a conventional integrated optical head apparatus. FIG. 1(c) is a detailed view of the optical system shown in FIG. 1(a), wherein the wavefront of divergent light from a source 100 using a semiconductor laser is divided into a main beam and two auxiliary beams at a first grating 101 and incident on a second grating 102 and a third grid 103 each having a semi-circular opening. A zero order diffracted wave component of the incident beam is focused on a memory medium 4 through a collimator 104 and an objective lens 105. Here, the distance d' between the spots of the main beam 107a and auxiliary beams 107b, 107c is designed to about 10 to 20 micrometers. These beams are reflected or diffracted by the pit surface of the memory medium 4, passes again through the objective lens 105 and the collimator 104, diffracted by the second and third gratings each arranged as a partial pattern of a holographic element, and received by a photodetecting system 108 split into 5 regions, whereby a focus is detected by a Foucault method and a tracking and an RF signal are detected by a 3-beam method. Note that the gratings 101, 102, and 103, which are formed on the opposite surfaces of the holographic element 109 can split the light into a plurality of wavefronts, and can be easily copied.

However, when a semiconductor laser is used as a source, in the optical head apparatus, the permissible fluctuation of a wavelength of the optical head apparatus is limited to about +10 nm even if other assembly errors are zero. Further, the tolerance of the relative positional error between the source 100 and the photodetecting system 108 is set to $\Delta X \leq 17$ micrometers in the X-axial direction and $\Delta Y \leq 40$ micrometers in the Y axial direction in the example shown in FIG. 1 for the reduction in size and the integration of the optical head apparatus, supposing that the objective lens has the focus length f=4.5 mm and the numerical aperture NA=0.45, and the collimate lens has the focus length f=21 mm and the numerical aperture N=0.11, and thus the assembly must be carried out with a pinpoint accuracy in a manufacturing process. In particular, in the case of an optical disk drive device provided with a recording/erasing system, it is difficult to ensure the reliability thereof in the circumference in which the device is used. This is because that a conventional Foucault method or astigmatic method is used as a focusing servo signal sensing system for the optical head apparatus, that is, this is because of the restriction resulting from the system (Foucault method) for forming a micro-spot (~10 micrometer dia.) on the surface of the photo-sensor or the system (astigmatism method) for sensing the balance of a distributed light quantity on the surface of a photo-sensor split into four sections. Whereas, there has been developed an optical head apparatus employing a spot size detection system (SSD) by which spots focused on two different focuses are differentially detected by linear photo-sensors interposed between the two focuses, as a focusing signal detection system which can allow a large amount of the relative positional error between a source 100 and a photodetecting system 3600 as shown in FIG. 1(b). (U.S. Pat. No. 4,929,823).

However, since this system obtains a tracking signal by differentially sensing a far field pattern of the tracking groove or pit in a memory medium 4, when a memory medium having only a pit train without having a groove, such as the so-called compact disk is reproduced, the tracking signal is unstably detected due to the offset of a servo signal caused by the inclination of the compact disk or the movement of an objective lens 3. Further, there remains a problem to realize a hologram element which can be easily blazed for restraining an unnecessary diffracted beam component as a hologram head arrangement for realizing a SSD system. In the arrangement shown in FIG. 1(b), the pattern of a third grating has a grating-shape having pitches of a few micrometers and further the pitches are set to 1 micrometer or less at the portion of the gratings where they intersect each other in order to make a distance h between the third grating and a source 100 to be a few millimeters, and thus the blazing thereof is very difficult.

Therefore, an object of the present invention is to provide an optical head apparatus wherein a large amount of the assembly error of a source and a photodetecting system is allowed when they are integrated, a stable servo signal with a restrained offset can be detected even from a memory medium having a shallow pit depth, and a diffraction optical element is provided which is easily blazed for restraining an unnecessary diffracted beam component. Further, another object of the present invention is to integrate an optical system as a whole to thereby further reduce the size of an optical head apparatus, lower the cost, and improve the mass-productivity and reliability thereof.

Here, a definition should be made, that is, the term "blazing" gives a meaning of giving optical characteristics to an optical element such that photoenergy is concentrated to a specified diffraction component.

SUMMARY OF THE INVENTION

To this end according to the present invention, there is provided a movable optical pick-up head apparatus of integrated lens and hologram type, comprising: a light radiation source, an imaging optics means having an optical axis, a hologram element including a diffraction optical element on which at least a pair of different blazed patterns are formed in separate zones which are not overlapped with each other so that the diffraction element is adapted for producing a zero order diffraction component beam from a beam which is received from the light radiation source, the imaging optics means converging the zero order diffraction component beam into a spot on a memory medium, and receiving a reflected beam from the spot, and further the diffraction element is adapted for producing a pair of first order diffraction component beams having different focused points from the reflected beam from the spot on the memory medium by way of the imaging option means, the first order diffraction component beams being deflected from the optical axis of the imaging optics means, an optical detection means having a plurality of split zones, for differentially obtaining a focusing error signal and a tracking error signal, and an actuator means for driving the imaging optics means in accordance with the tracking error signal and the focusing error signal so as to allow the spot to precisely scan the memory medium.

BRIEF DESCRIPTION OF THE DRAWINGS

FIGS. 1(a) and 1(b) are perspective views respectively illustrating examples of optical systems of conventional optical head apparatuses;

FIG. 2(b) is a schematic view showing optical paths in a conventional optical head apparatus;

FIG. 6(c) is a sectional view illustrating the arrangement shown in FIG. 6(a);

EMBODIMENTS

Figure 11A:
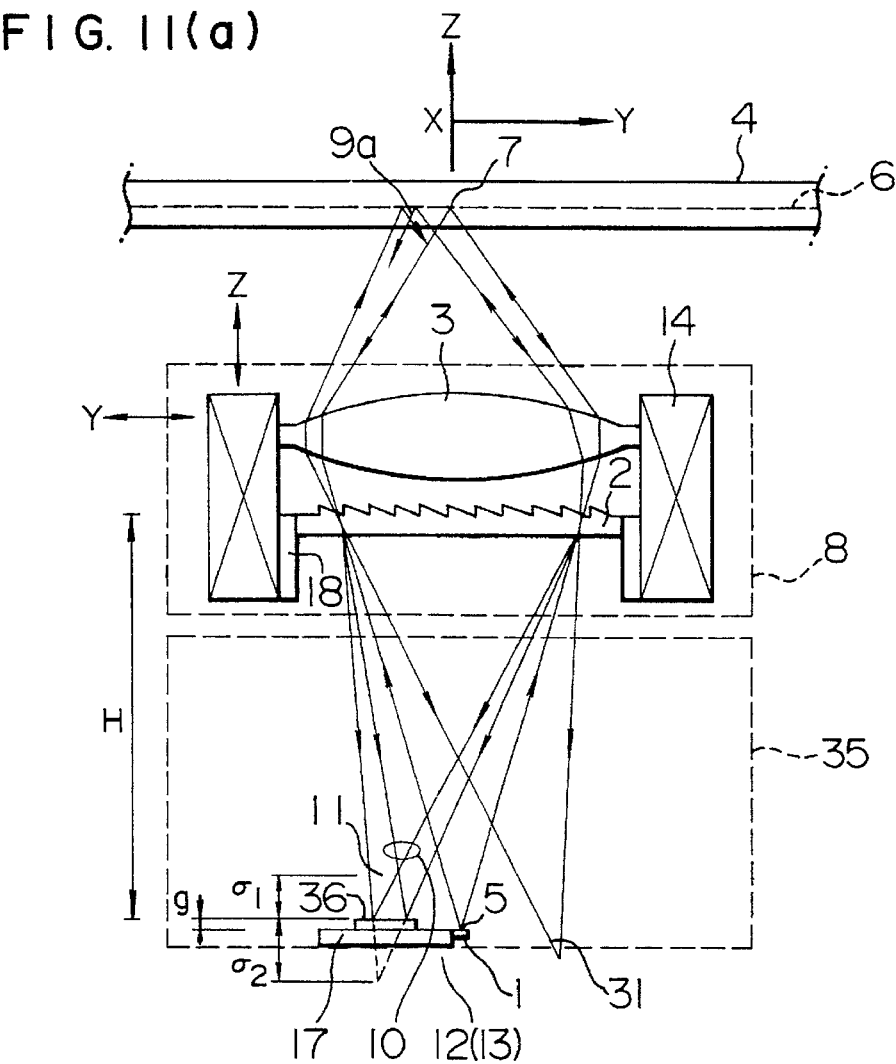
FIG. 11(a) is a schematic view illustrating a first embodiment of an optical head apparatus according to the present invention.

A first embodiment according to the present invention will be described below with reference to FIG. 11(a). More specifically, in FIG. 11(a), designated at 1 is a source using a semiconductor laser producing a coherent beam having a wavelength in a near infrared rays region (e.g., λ=780 nm); designated at 2 is a diffraction optical element using a hologram element in which Fresnel zone plate-like patterns are formed being not overlapped with each other for producing a plurality of diffraction wavefronts having the same diffraction order and different focuses outside the optical-axis; designated at 3 is an image optics using an objective lens having a numerical aperture NA =about 0.45; designated at 4 is a memory medium such as a compact disk, optical disk having a tracking groove or the like; and designated at 12 and 13 are a pair of photodetecting systems having a plurality of split regions for respectively receiving the above diffraction wavefronts and differentially obtaining a focusing error signal and a tracking error signal.

A beam radiated from the beam radiation point 5 of the source 1 onto the diffraction optical element 2, is converged to a micro-spot at the image optics 3, and is incident upon a focusing point 7 on the pit surface 6 of the memory medium 4. At this time, the diffraction optical element 2 only uses a zero order diffracted beam on a going path and does not use a little defocused beam 9a and the like of a +1 order diffracted beam. In addition, a beam on a return pass reflected or diffracted from the pit surface 6 is incident upon the diffraction optical element 2 through the image optics 3 and produces the diffraction wavefronts 10, 11 of a plurality of beams 15, 16 having a different focus outside of an optical axis by the +1 order diffracted beam of the diffraction optical element 2. These diffraction wavefronts are incident upon a pair of the photodetecting systems 12, 13 in the vicinity of the focus of the +1 order diffracted beam.

Designated at 8 is the drive unit of an actuator (not shown) having a movable unit 14 for integrally driving the focusing optics 3 and the diffraction optical element 2; designated at 35 is a holding unit for holding the source 1 and the photodetecting systems 12, 13; and X, Y and Z designate directions.

Figure 11B:
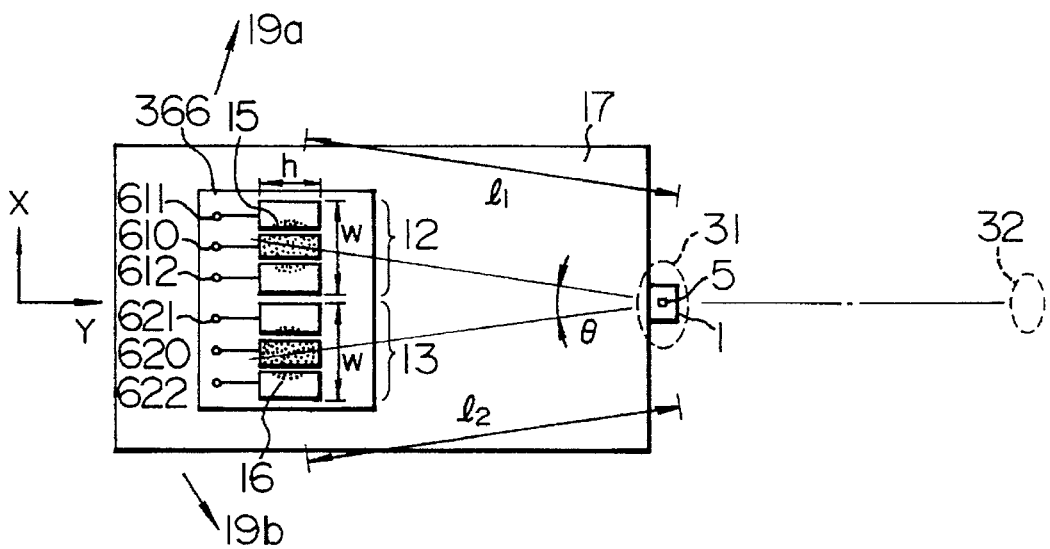
FIG. 11(b) is a plan view illustrating a mount on which a beam source and photodetecting systems of the optical head apparatus shown in FIG. 11(a) are incorporated.

In FIG. 11(b), each of the photodetecting systems 12, 13 has a plurality of split regions defined by slits, having a width of w and a length h in the split line direction. Further, each photodetector uses a linear type silicon photodetector and fixed on the upper surface of the mount 17 of the source 1 and spaced apart from the beam radiation point 5 by a height g. Note that the height g can be arbitrarily set depending on the design of a Fresnel zone plate-like pattern. Designated at 610 to 612 are the output terminals of the respective split regions of the photodetecting system 12 and designated at 620 to 622 are the output terminals of the respective split regions of the photodetecting system 13. The diffraction wavefronts 10, 11 shown in FIG. 11(a) have focuses to which beams reflected or diffracted by the pit surface 6 are converged, the focuses being located at positions apart from the beam receiving surface 36 of each of the photodetecting systems 12, 13 in the thicknesswise direction thereof by distances δ1, δ2, and when the focusing optics 3 focuses, the respective beams 15, 16 on the beam receiving surface 14 have the same beam size, but when the imaging optics 3 does not focuse the beam, the beam has a different size. This difference is detected as a differential signal after the photodetecting systems 12, 13 having carried out a photoelectric conversion and is fed back to the movable unit 14 of the actuator to thereby adjust the focus of the imaging optics 3.

Further, the above mentioned diffraction optical element 2 forms a Fresnel zone plate-like pattern on the side thereof facing to the phase-type hologram imaging optics 3, and is fixed to the movable unit of the actuator together with the imaging optics 3. Before fixed thereto, the diffraction optical element 2 or the cylindrical unit 18 thereof is adjusted by being rotated about the beam radiation point 5 by a slight angle (arrows 19a, 19b) so that the positions of the beams 15, 16 are optimized with respect to the photodetecting systems 12, 13 shown in FIG. 11(b) in such a manner as shown in the figure. $l_1$ and $l_2$ represent distances between the photodetecting systems 12, 13 and the beam radiation point 5, and θ represents an angle at which a pair of the photodetecting systems 12, 13 are observed from the beam radiation point.

Figure 12A:
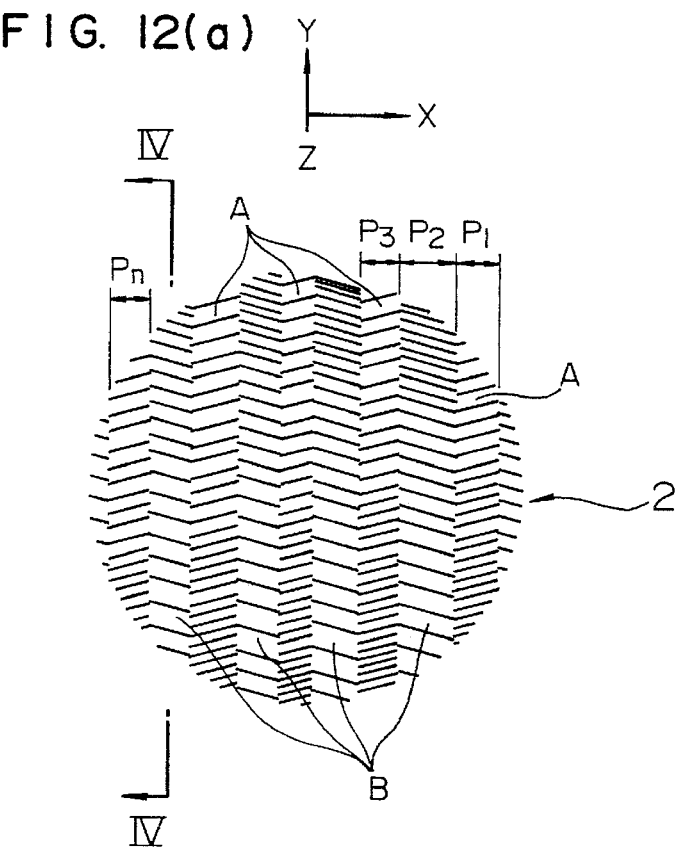
FIG. 12(a) is a plan view illustrating an optical diffraction element having a blazed hologram which is essential in the first embodiment of the present invention.
Figure 12B:
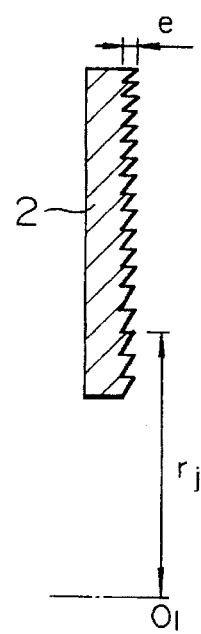
FIG. 12(b) is a cross-sectional view illustrating the diffraction element shown in FIG. 12(a)

FIG. 12(a) is a conceptual view of the diffraction optical element 2 wherein two kinds of coarse grating regions A, B each having a width Pj (=P1~Pn) are alternately disposed. Each of grating-like regions A, B is non-continously provided with linear Fresnel zone plate-like patterns disposed like a reed screen (off-axis linear Fresnel zone plates) so that they intersect at an angle θ, and thus form blazed phase gratings having a cross section with a depth e as shown in FIG. 12(b). Further, each width Pj of regions A, B shown in FIG. 12(a) is differently set to substantially restrain the formation of a primary order diffracted beam corresponding to a coarse grating cycle period. Also, as plainly seen in FIG. 12(a), the grating regions A, B are separated by boundaries extending in a first direction and are disposed alternately an a second direction different from the first direction.

Figure 14A:
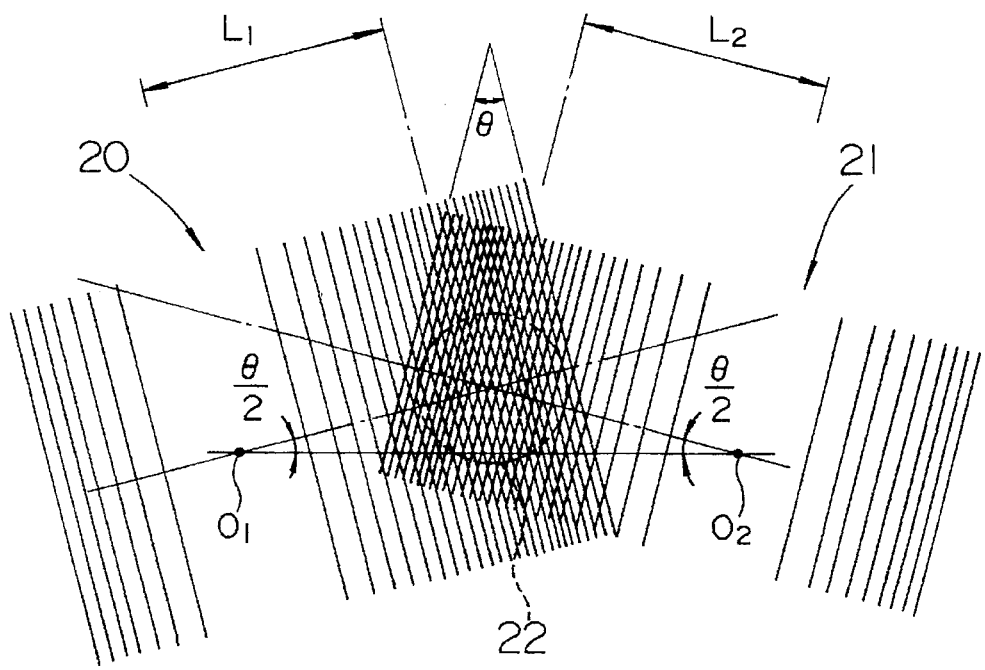
FIG. 14(a) is a view showing a basic design of linear Fresnel zone plate-like patterns.
Figure 14B:
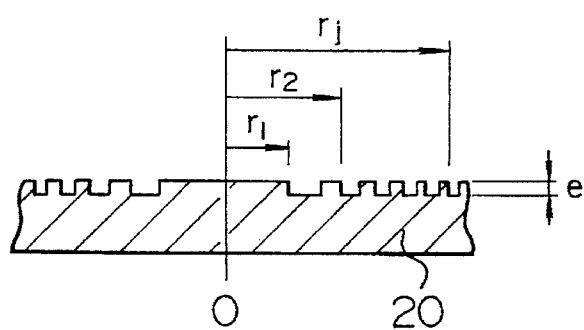
FIG. 14(b) is a cross-sectional view illustrating a phase structure giving the linear Fresnel zone plate-like patterns shown in FIG. 14(a)

FIG. 14(a) shows a design principle of the linear Fresnel zone plate-like patterns. The linear Fresnel zone plate-like patterns 20, 21 have centers at the points $O_1, O_2$ on a center line and a cross-sectional phase structure as shown in FIG. 14(b), are given by the following relation which is similar to that known as a two-dimensional Fresnel ring band plate, and the pattern in the circle 22 surrounded by a dotted line of FIG. 14(a) is used.

$$r^2 = 2j\lambda fz + j^2\lambda^2$$

where, λ represents the main wavelength of the source 1, j represents a sequential number of a grating counted from the center $O_1, O_2$ of each Fresnel zone plate-like pattern, and fz represents a focal length (provided by the diffraction wavefront in one dimensional direction under the action of convex and concave lenses). These patterns can achieve the object thereof by being recorded by a laser interference fringe or being formed by a computer which calculates the patterns.

Further, the linear Fresnel zone plate-like patterns 20, 21 intersect to each other at an angle θ. However, they are not used in a superimposed arrangement as shown in FIG. 14(a), but as shown in FIG. 12(a), the grating regions A correspond to that obtained by drawing the half of the Fresnel zone plate-like pattern 20 of FIG. 14(a), as observed through the reed screen having a width Pj, the grating regions B correspond to that obtained by drawing the half of the Fresnel zone plate-like pattern 21, and they are not overlapped with each other. Here, the distances $L_1, L_2$ between the center of the opening 22 and the axial centers $O_1, O_2$ of the linear zone pattern are given by the following equations, when the distances $l_1, l_2$ shown in FIGS. 11(a) and 11(b) and H (the distance between the diffraction optical element 2 and a detected surface 14) are given.

$$L_1 = l_1 \times fz_1/H$$

$$L_2 = l_2 \times fz_2/H$$

where, $fz_1$ and $fz_2$ represent the focal distances of a pair of the Fresnel zone plate-like patterns 20, 21 and are designed, taking the value of g into consideration so as $\delta_1 = \delta_2$, but the detail thereof is not described here.

When output signals from the output terminals 610 to 612 and 620 to 622 of the photodetecting systems 12, 13 are represented by S610 to S612, S620 to S622, a focusing error signal FE is given by:

$$FE = S610 - S620$$

Alternately, when a beam utilization efficiency is more improved, it is given by:

$$FE = [S610 - (S611 + S612)] - [S620 - (S621 + S622)]$$

Further, in this embodiment, the tracking direction of the memory medium 4 is caused to coincide with the direction Y of the split line of the photodetecting systems 12, 13, so that a tracking error signal by a push-pull system represented by the following equation can be obtained.

$$TE = (S611 - S612) + (S621 - S622)$$

In addition, an RF signal is given by:

$$RF = S610 + S620$$

or $$RF = S610 + S611 + S612 + S620 + S621 + S622$$

Then, the actuator is driven so that the obtained focusing error signal and tracking error signal become zero.

Note that in FIG. 11(b), 31 designates the focused +1 order beam obtained in such a manner that the beam 9a of the +1 order beam on the going path is reflected on the pit surface 6 and then diffracted by the diffraction optical element 2 on the return path which however does not affect the photodetecting systems 12, 13; and 32 designates the focused zero order beam obtained in such a manner that the beam 9a of the +1 order beam on the going path is reflected on the pit surface 6 and then diffracted by the diffraction optical element 2 on the return path, which raises no problems at all.

According to the embodiment, the arrangement is such that the beam coming from the micro spot after having been focused on the memory medium 4 produces a pair of diffracted beams through the diffraction optical element 2 and the diffracted beams are received by each split region of a pair of the photodetecting systems 12, 13 so that a tracking error signal and focusing error signal are differentially obtained, and thus a large degree of the relative positional error between the source 1 and the photodetecting systems 12, 13 can be allowed. More specifically, since the focus detection by the SSD system is employed, a mechanical adjustment error can be allowed to 5 to 10 times as large as that of, for example, the astigmatic method (the tolerance in the case of the SSD method as compared with the astigmatic method was evaluated as the result of an experiment effected by the inventors).

Further, since the diffraction optical element 2 is formed with a pair of the Fresnel zone plate-like patterns which are not superposed with each other, the occurrence of a beat beam which would be produced of they were superimposedly formed can be prevented and the Fresnel zone plate-like patterns can be easily blazed, resulting in that an unnecessary diffracted beam component can be restrained and the diffraction optical element 2 can be integrated in the vicinity of the imaging optics 3. Moreover, a pair of the diffracted beams are received by split regions of a pair of the optical instrument systems and differentially detected, tracking and focusing stable servo signals can be detected even if a memory medium having a shallow pit depth is used.

Further, since the Fresnel zone plate-like pattern is a linear Fresnel zone plate-like pattern formed only in the one dimensional direction and it gives a beam having a cross section of a micro width on the detecting surface of the photodetector, the size in the pattern train direction of the linear Fresnel zone plate-like pattern can be shortened. More specifically, the size of the photodetecting systems 12, 13 can be set as h<w, as shown FIG. 11(b). Therefore, the size of the mount 17 as the substrate on which the source 1 and the photodetecting systems 12, 13 are integrated can be reduced and the range of a response frequency can be easily increased, and thus, tracking and focusing stable servo signals can be detected, even with, for example, a record and erasing type optical disk and the like having a large fluctuation in wavelength of a source. Further, the linearization of the Fresnel zone plate-like pattern enables the same to be more easily blazed and the serve detection is more stabilized by integrally driving the optical element 2 and the imaging optics 3.

Note that the detail of a two-dimensional Fresnel zone pattern will be apparent from, for example, Japanese Unexamined Patent. Nos. 62-251025 and 62-251026.

The source 1 may be a semi-coherent beam.

Figure 14C:
FIG. 14(c) is a cross-sectional view illustrating a phase structure variant from the structure shown in FIG. 14(b)

Further, although the Fresnel zone plate-like pattern has a sawtooth-shaped cross section as shown in FIG. 12(b), it may be blazed stepwise, as shown in FIG. 14(c), to restrain the ratio of a −1 order diffracted beam to a +1 order diffracted beam. As a design example of FIG. 14(c), level differences between 4 stages can be made equal to each other so as to realize such conditions as a depth e≈870 nm, a refractive index of an element substrate n≈1.455, a wavelength λ=788 nm, a beam utilization efficiency in the going and return paths $\eta_0 \times \eta_{-1} = 10\%$, and $\eta_{-1}/\eta_{+1} = 7\%$, where $\eta_{-1}$ represents the diffraction efficiency of the −1 order diffracted beam and $\eta_{+1}$ represents the diffraction efficiency of the +1 order diffracted beam.

Figure 15A:
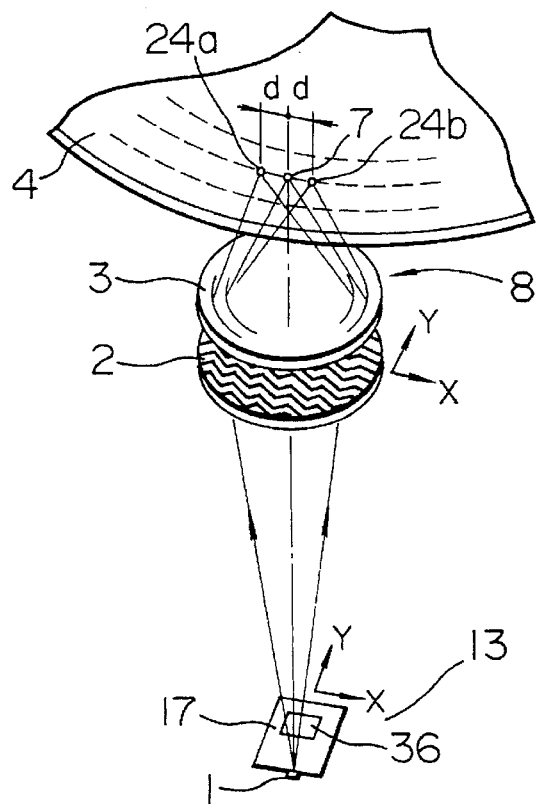
FIG. 15(a) is a perspective view illustrating a second embodiment of the optical head apparatus according to the present invention.
Figure 15B:
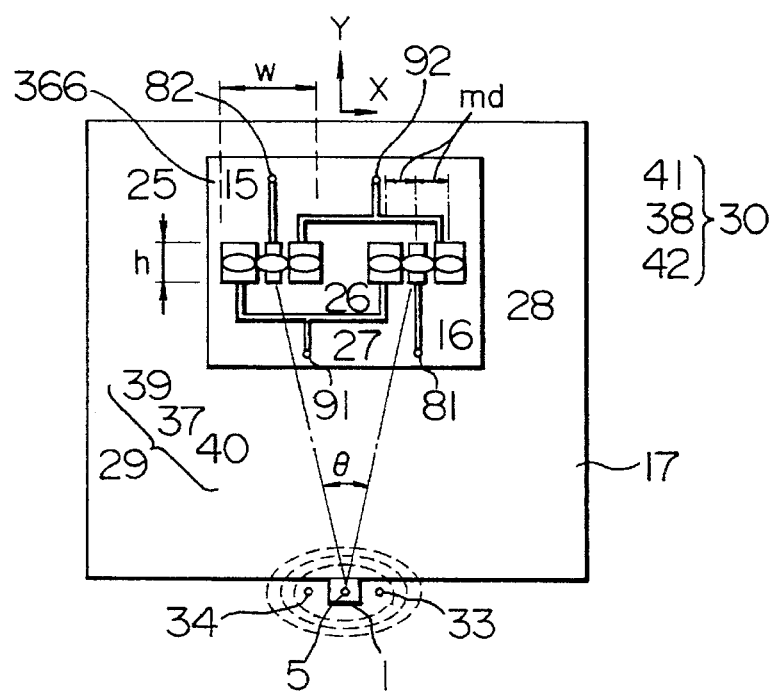
FIG. 15(b) is a plan view illustrating a mount on which a beam source and photodetecting system of the optical head apparatus shown in FIG. 15(b) are provided.

FIGS. 15(a) and 15(b) show a second embodiment according to the present invention. More specifically, this optical head apparatus is arranged in the first embodiment such that a plurality of each pair of the Fresnel zone plate-like patterns of the diffraction optical element 2 are alternately disposed with the same width. Further, a pair of photodetecting systems 29, 30 are composed of focusing detection units 37, 38 for detecting diffraction wavefronts 15, 16 produced by a pair of the Fresnel zone plate-like patterns and tracking detection units 39 to 42 for detecting diffraction wavefronts 25 to 28 which are produced in the disposing direction of the pairs of the Fresnel zone plate-like patterns which are alternately disposed with the same width p thereof.

More specifically, when all of the widths Pj of the grating-like regions A, B shown in FIG. 12(a) are set to have the same value Pj=P, a new primary order diffracted beam corresponding to the grating cycle periods having a width P is produced as an auxiliary beam. The auxiliary beam made by a diffraction optical element 2 on a going path produces micro-spots at the focusing points 24a, 24b on a pit surface 6 and the reflected or diffracted beam thereof is diffracted by the diffraction optical element 20 thereby to produce auxiliary beams 25, 26 and 27, 28 on a return path. Then, a focusing error signal can be detected by the main beam on the diffraction wavefronts 15, 16 and a tracking error signal of a three-beam method can be detected by the auxiliary beams 25 to 28. In FIG. 15(b), each of the photodetecting systems 29, 30 is split into three regions each having a rectangular opening and uses a differential type linear photodetector. The output terminals 81, 82 of the photodetectors 37, 38 and the output terminals 81, 82 of the photodetectors 39 to 42 deliver output signals S81, S82, S91, and S92, and accordingly, a focusing error signal FE and a tracking error signal TE are given by:

$$FE = S81 - S82$$

$$TE = S91 - S92$$

Further, the relationship between the tracking direction (pit train direction) $X_0$ of the a memory medium 4 and the direction X in which the regions A, B of the diffraction optical element 2 are disposed is substantially parallel, and thus the position of the auxiliary beam is adjusted similarly to that in a tracking detection system of the so-called 3-beam method.

Note that designated at 33, 34 are the centers of +1 order diffracted beams obtained in such a manner that the +1 diffracted beams of the auxiliary beam, which are made by the diffraction optical element 2 on the going path and focused on the focusing points 24a, 24b, are reflected on the memory medium 4 and are then diffracted by the diffraction optical element 2.

According to the embodiment, the diffracted beams made by pairs of the Fresnel zone plate-like patterns disposed with the same width P are differentially detected by the tracking detection units 39 to 42 thereby to obtain the tracking error signal by the 3-beam method. In this case, it is sufficient that if the photodetecting systems 29, 30 can obtain a correct signal in the vicinity of the focus of the diffraction optical element 2, the distance md between the respective diffracted beams can be minimized, where m is designed to about 0.2 in terms of the coupling ratio of an imaging optics 3 and d is designed to about 10 to 15 micrometers in terms of the distance between the point 7 on the pit surface 6 and the focusing points 24a and 24b. Therefore, the 3-beam tracking system, which has been widely applied for, for example, the memory medium 4 such as a compact disk having a pit train depth of about λ/5 to a disk medium having a groove, can be further developed, so that the effect of an abnormal tracking error signal caused by flaws on a disk can be restrained without sacrificing other characteristics by designing the spot spacing of main and auxiliary beams to 12 micrometer or less. Further, the reduction in the beam spacing can increase the width P of the Fresnel zone plate-like pattern, and thus the diffraction optical element 2 can be easily made.

In addition, since the focusing detection units 37, 38 and the tracking detection units 39 to 42 of the photodetecting systems 29, 30 are disposed in parallel with the tracking direction $X_0$ of the memory medium 4, i.e., the split line direction Y of the diffraction optical element 29, 30 is made orthogonal to the tracking direction $X_0$, a change in a far field pattern, which is caused when the micro-spot having focused a light beam on the memory medium 4 goes across the tracking groove or pit train of the memory medium 4, does not affect the focusing error signal, and thus a stable servo signal can be detected.

Further, although the diffraction optical element of a hologram element using the conventional 3-beam method needs to form gratings on the front and the back surfaces thereof in order to achieve a desired object, thus object can be achieved only by a relief pattern formed on one surface in this embodiment, and thus this embodiment is excellent in mass-productivity and reliability. In particular, when considering that the diffraction optical element 2 of the hologram element is characterized in the mass-production of copies of the relief patterns, it will be understood that the embodiment has a great effect.

In addition to the above, the embodiment has functional effects similar to those of the first embodiment.

Note, although not particularly shown, as another embodiment, the diffraction optical element 2 may be designed as a reflecting type phase grating and further the grating may be blazed to a sawtooth shape in accordance with the first and second embodiments. In addition, a technology of blazing the diffraction optical element 2 which is common to the respective embodiments can be realized, for example, in such a manner that after rectangular waveform gratings have been formed on a quartz substrate as a photoresist pattern, asymmetric grating are formed by oblique ion beam etching or electron beam drawing. In this case, one of the diffracted beam components (−1 order beam) produced in the diffraction on the return path from the Fresnel zone plate-like pattern is a weak beam and thus even if a portion thereof is mixed on the photodetecting systems 12, 13, 29, 30 as a zero order beam on the return path, the intensity ratio thereof to the −1 order beam can be made to 15 to 20% or less and the effect thereof can be substantially ignored.

Here, a consideration will be made to the problem of a noise component caused when a diffracted beam, which in not necessary on the going and return paths, is incident on the photodetector. Incidentally, the problem would be caused if a hologram element and an objective lens were integrally supported and accommodated in an actuator.

Figure 2A:
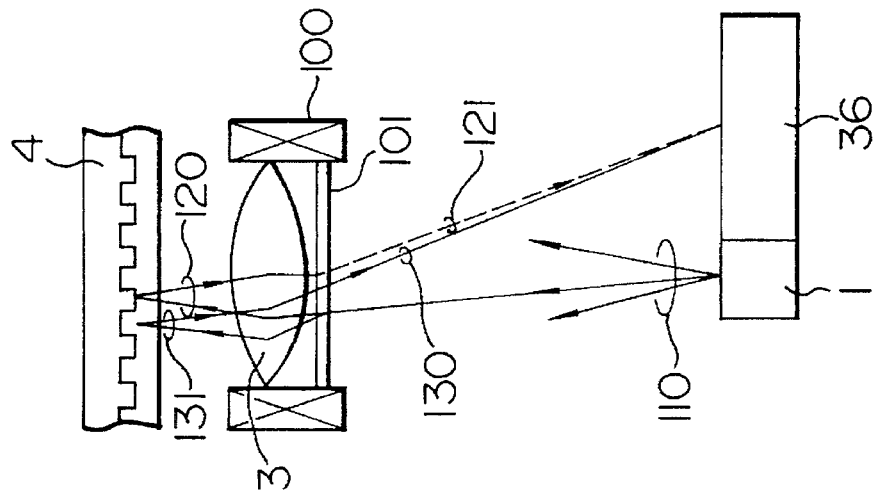
FIGS. 2(a) and 2(b) are schematic views illustrating a conventional optical head apparatus.

FIG. 2(a) exemplifies a recent case of the optical system of an optical head apparatus simplified by using a hologram (e.g., Japanese Unexamined Patent No. 64-62838).

Figure 1C:
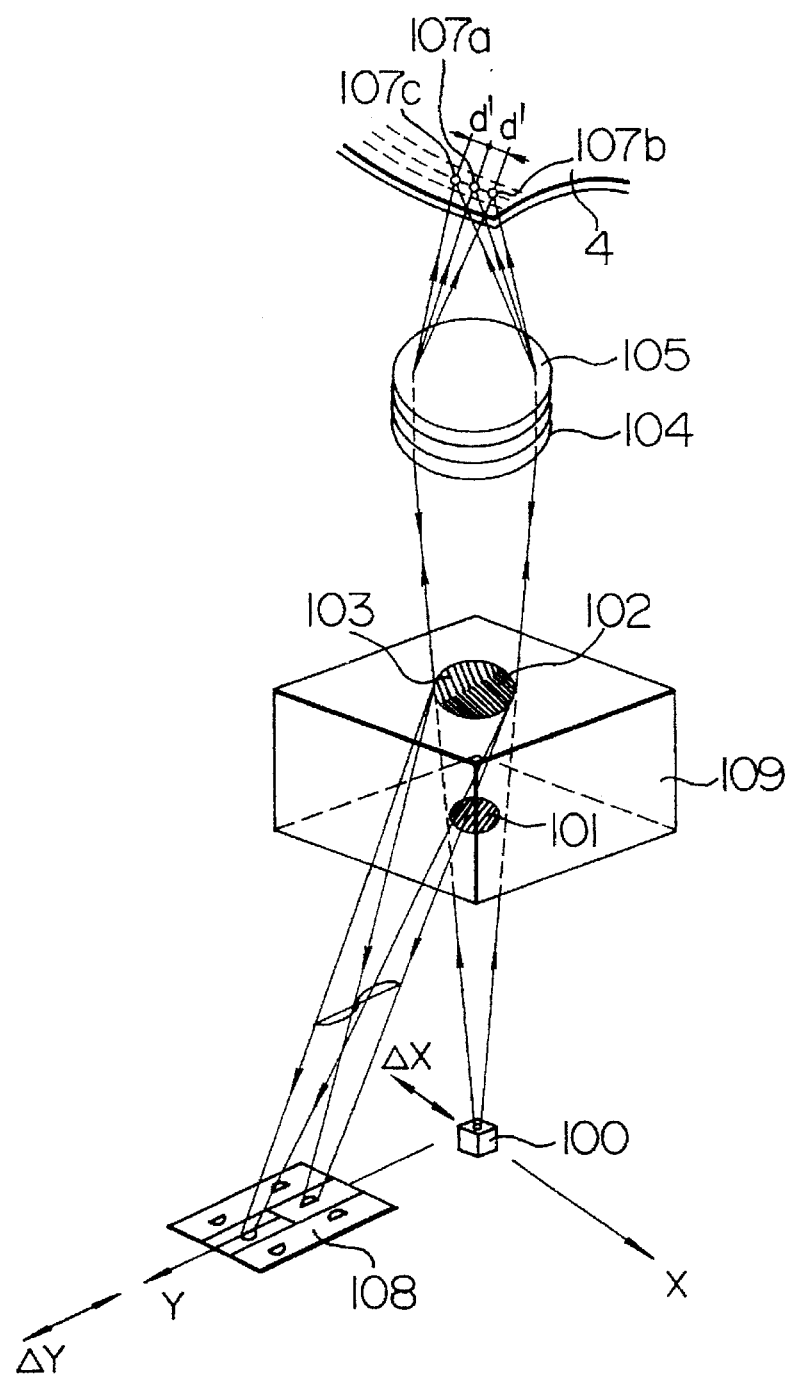
FIG. 1(c) is a perspective view illustrating details of the optical system shown in FIG. 1(a)

In FIG. 2(a), 1 designates a light radiation source such as a semiconductor laser and the like. A radiated beam 110 (laser beam) coming from the source 1 passes through the hologram 101, is incident on an objective lens 8, and focused on an optical memory medium 4. Here, consideration will be made not on a servo detection system employed by the hologram element but on an unnecessary diffracted beam. A light beam reflected on the optical memory medium 4 follows an original beam path in the reverse direction and is incident upon the hologram 101. A +1 order diffracted beam 121 produced from the hologram is incident on a photodetector 36. A servo signal and a data signal can be obtained by calculating an output from the photodetector 36.

In the case wherein an objective lens 3 can be moved by an actuator independently from the hologram 101, when the objective lens 3 is moved by following a tracking and the like, the emitted beam 110 on the hologram 101 is also moved. Therefore, the image of a +1 order diffracted beam on the photodetector 36 is also moved, whereby the servo signal is adversely affected, whereas, as shown in FIG. 6, since the hologram 101 and the objective lens 3 are disposed keeping a predetermined relative position with respect to the actuator 100, even if the objective lens 3 is moved with respect to the actuator 100 to effect a tracking control, the beam reflected on the optical memory medium 4 is little moved on the hologram 101. Therefore, a signal obtained from the photodetector 36 is not deteriorated regardless of that the objective lens 3 is moved.

Figure 2B:
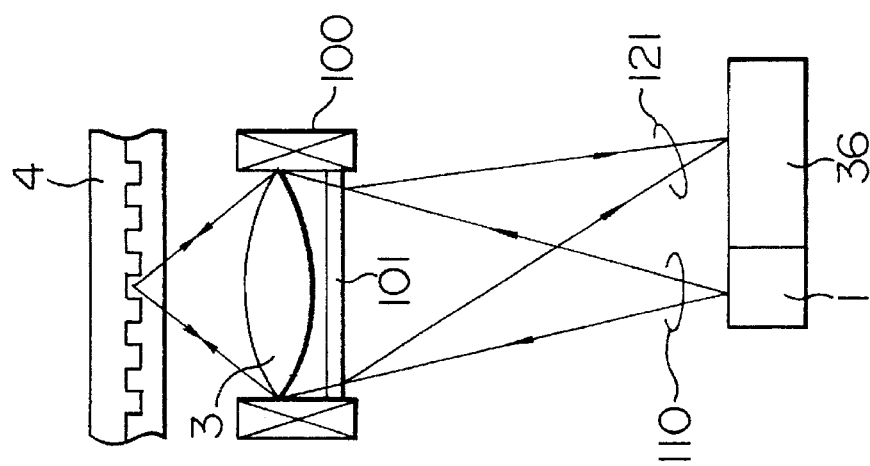

With the optical system arranged as described above, however, since a diffracted beam is also produced from the hologram 101 on the beam path from the beam radiation source 1 to the optical memory medium 4 (hereinafter, referred to as a going path), the diffracted beam is reflected on the optical memory medium 4 and focused on the photodetector 36 by the objective lens 3. When a +1 order diffracted beam that is produced on the beam path from the memory medium 4 (hereinafter, referred to as a return path), which goes to the photodetector 36 after being reflected on the optical memory medium 4, focused by the objective lens 3 and diffracted by the hologram 101, is used to obtain a signal, a −1 order beam produced on the going path is incident upon the same position as that of the +1 order diffracted beam on the return path on the photodetector 36. FIG. 2(b) shows this state.

The −1 order diffracted beam 121 on the going path, which has become the zero order diffracted beam 130 on the return path and the +1 order diffracted beam 121 on the return path of the zero order diffracted beam 120 on the going path are reflected on different positions on the optical memory medium 4, and thus they naturally have different data. Therefore, this optical system having the integrated lens and hologram has a problem in that the quality of a servo signal and data signal is deteriorated by the −1 order beam 121 on the going path.

To solve the above problem and prevent an emitted beam on the hologram from being moved by the beam of an objective lens and the quality of a signal from being deteriorated by a −1 order diffracted beam on a going path, the present invention comprises a light radiation source, the objective lens for receiving a radiated beam coming from the light radiation source and causing the same to be focused on an optical memory medium, a blazed hologram integrally supported by the support member of the objective lens, and a photodetector for producing an output b receiving a diffracted beam which is produced by the radiated beam reflected on the above optical memory medium and incident on the objective lens integrated with the above hologram, the output being produced in accordance with each diffracted beam or a beam quality obtained by splitting each diffracted beam into a plurality of diffracted beams.

Since the integration of the blazed hologram with the objective lens in the present invention enables an emitted beam on a return path to be incident on a predetermined portion of the hologram regardless of that the objective lens is moved because it follows a tracking, the diffracted beam produced from the hologram does not move on the photo-detector. Further, since the hologram is blazed, i.e., since the cross section of the hologram is made asymmetric, the diffraction efficiency of the −1 order diffracted beam is smaller than that of a +1 order diffracted beam, and thus a servo signal or data signal is less deteriorated by the −1 order diffracted beam on the going path. Therefore, the servo and data signals can be stably read.

Figure 6A:
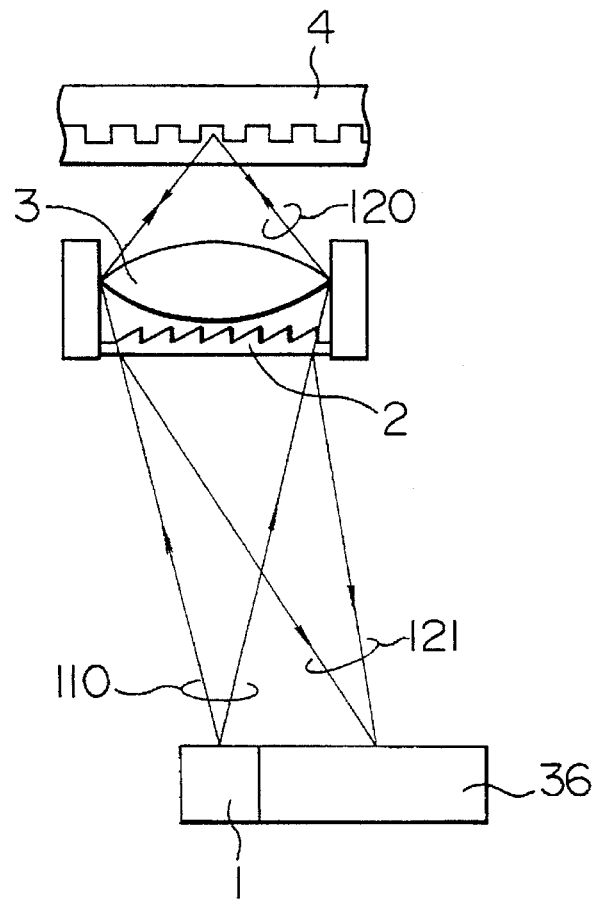
FIG. 6(a) is a conceptional view illustrating an arrangement according to the present invention.

An embodiment of the present invention will be described below in this regard with reference to drawings. FIG. 6(a) is a diagram of the conceptual arrangement according to the present invention, which shows a simplified arrangement of FIG. 11(a). Designated at 1 is a light radiation source such as a semiconductor laser or the like. A radiated beam 110 (laser beam) coming from the source passes through a hologram 2, is incident on an objective lens 3, and focused on a optical memory medium 4. The beam reflected on the optical memory medium 4 follows an original beam path and is incident on the hologram 2. A +1 order diffracted beam 121 produced from the hologram 2 is incident on a photodetector 36. A servo signal and a data signal can be obtained by calculating an output from the photodetector 36.

As described above, the present invention is characterized in that the hologram 2 is blazed and integrated with the objective lens 3. The effect that the diffraction efficiency of a −1 order diffracted beam is made smaller than that of a +1 order diffracted beam can be obtained by the blazing, which is described, for example, in "Blazing of Micro Fresnel Lens Made by Electron Beam Drawing" by Fujita, Nishihara, Koyama, Technical Report of The Institute of Electronics, Information and Communication Engineers, Vol. 82, No. 47, pp 49–55 (OQE 82-25), 1982 and the like. Although this paper uses blazing to improve the focusing characteristics of a Fresnel lens, the present invention uses the blazing to restrain the beam quantity of a −1 order diffracted beam on a going path produced from a hologram, wherein the blazing controls the beam quantity of the diffracted beam component of a zero order beam, a +1 order diffracted beam and the like.

Figure 6B:
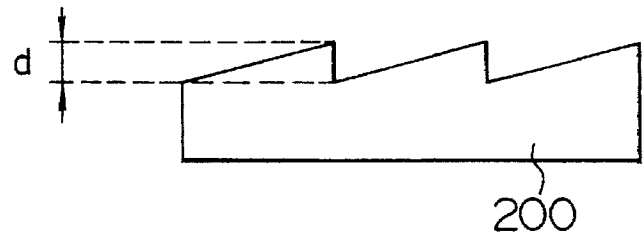
FIG. 6(b) is a cross-sectional view illustrating a part of an optical diffraction element used in the arrangement shown in FIG. 6(a)

FIG. 6(b) shows an example of a blazed hologram 200 which is embodied as an analog type hologram having a sawtooth-shaped cross section. In FIG. 6(b), assuming that the difference between the crest and valley of a relief is d, the refractive index of a transparent substrate constituting the hologram 200 is n, the refractive index of the periphery of the hologram 200 is n0, and the wavelength of a light radiation source 1 is λ, a phase modulation degree is determined by:

$$\phi = 2\pi \cdot d(n-n0)/\lambda$$

Figure 7:
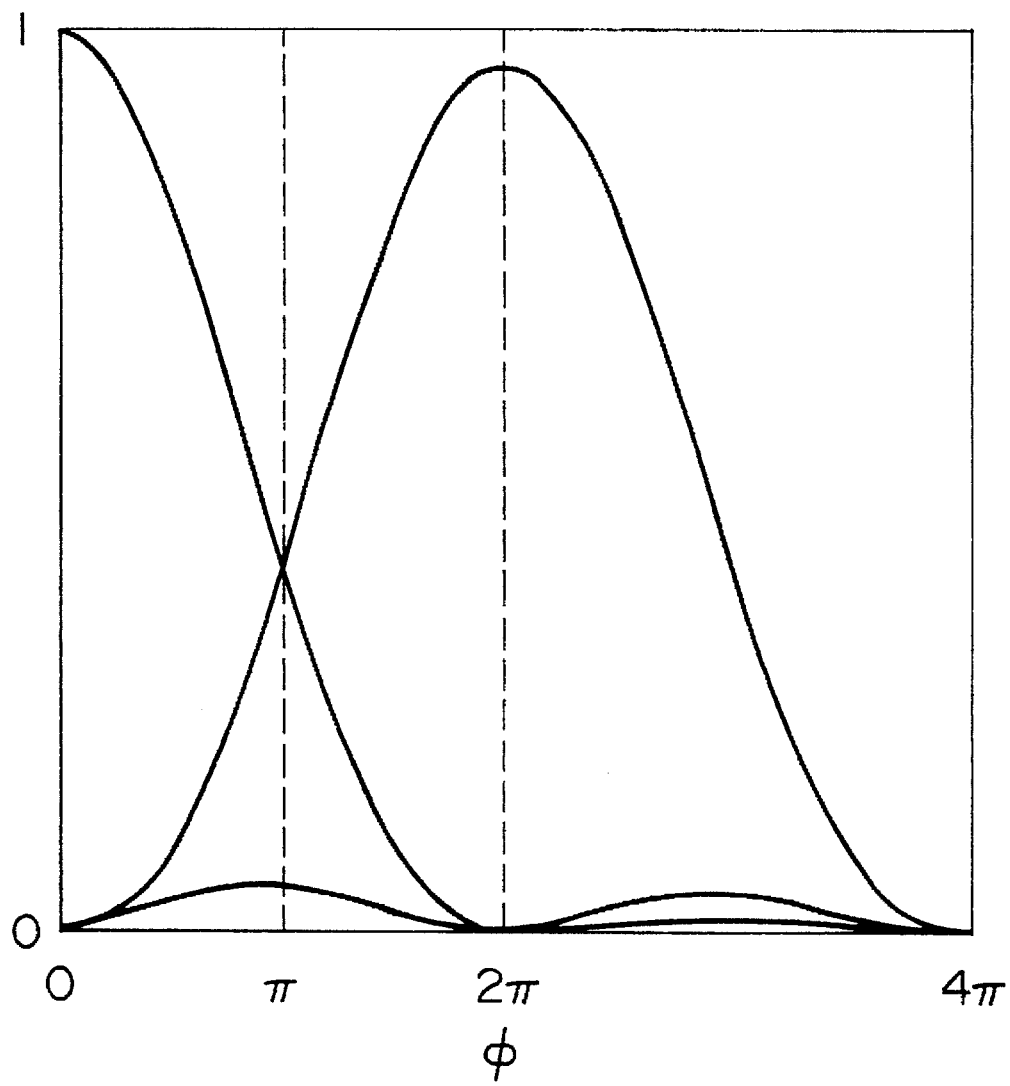
FIG. 7 is a graph showing a relationship between a phase modulation degree and a diffraction efficiency.

FIG. 7 shows a graph of the relationship between $\phi$ and a diffraction efficiency.

As shown in the above paper, it is sufficient to satisfy $\phi = 2\pi$ to maximize the diffraction efficiency of the +1 order diffracted beam, whereas in the present invention, since a +1 order diffracted beam 131 on a return path, which has been a zero diffracted beam 120 reflected on a optical memory medium 4 and then diffracted by a blazed hologram, is used to detect a signal, the diffraction efficiency (transmittance) of the zero order diffracted beam 120 on a going path must be also large. Furthermore, the diffraction efficiency of the −1 order diffracted beam must be smaller than that of the +1 order diffracted beam. Thus, when a sawtooth-shaped blazing is effected as shown, for example, in FIG. 6(b), the above object can be achieved by setting $\phi$ between $\pi$ to $2\pi$. The principle of design will be described below.

Figure 4A:
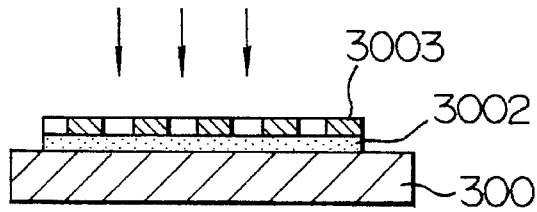
FIGS. 4(a) to 5(f) are sectional views showing conventional processes of manufacturing optical diffraction elements.
Figure 4B:
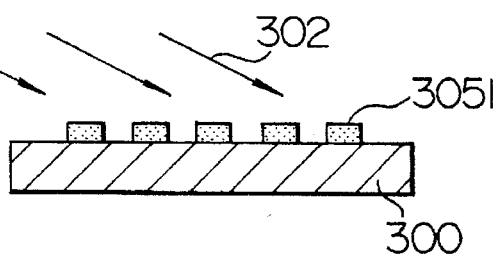
Figure 4C:
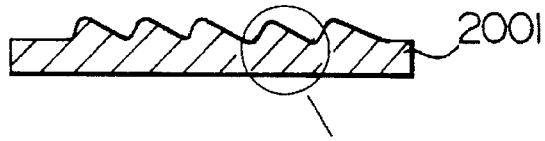
Figure 4D:
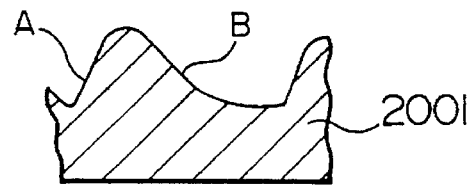
Figure 5A:
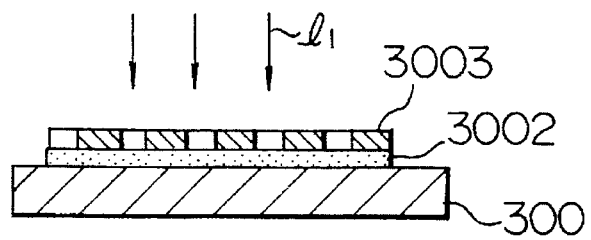
Figure 5B:
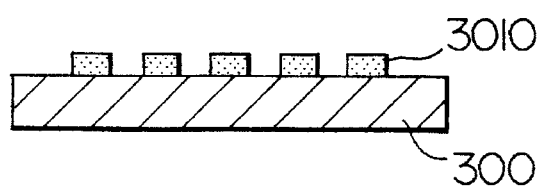
Figure 5C:
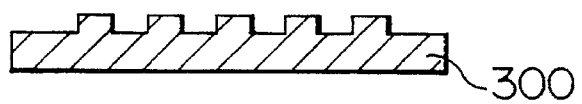
Figure 5D:
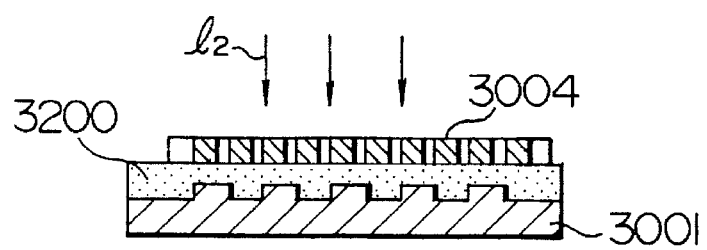
Figure 5E:
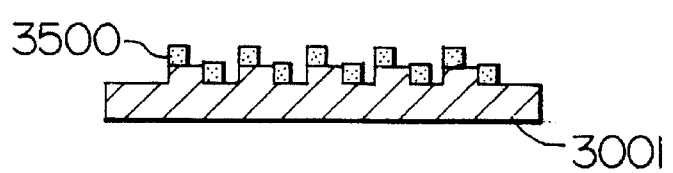

FIGS. 4(a) to 4(d) and FIGS. 5(a) to 5(f) exemplify conventional methods of producing well-known blazed hologram. The blazed hologram is made in such a manner that, for example, as shown in FIGS. 4(a) to 4(d), a photoresist 3002 is coated on the surface of a substrate 300 shown in FIG. 4(a), the photoresist is exposed after being covered with a chrome mask 3003 and then developed to make a masking pattern 3051, and further an ion beam 302 is obliquely irradiated to the surface of the substrate 300 shown in FIG. 4(b) to obtain a blazed hologram 2001 as shown in FIG. 4(c). FIG. 5(d) is an enlarged view of a main part of FIG. 5(c), wherein inclined surfaces A, B are asymmetrically formed.

Figure 5F:
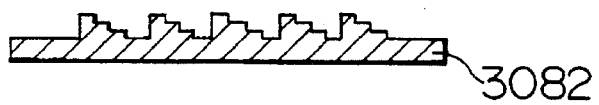

Furthermore, when etching is repeated a plurality of times as shown in FIGS. 5(a) to 5(f), i.e., when a resist 3200 and a mask 3004 are formed and exposure in FIG. 5(a) and development in FIG. 5(b) are carried out after the process in FIG. 5(c) has been carried out to form a masking pattern 3500, and then etching is carried out in this state, a blazed hologram 3082 having the surface thereof near to a sawtooth shape can be obtained, as shown in FIG. 5(f).

However, the cross section obtained by the method shown in FIGS. 4(a) to 4(d) is disadvantageous as shown in an enlarged view of FIG. 4(d). More specifically, a surface A is not vertically formed but is inclined. Further, an inclined surface B has a concave shape. Thus, the conventional method has a problem in that since this method only provides a cross section which is different from the accurate sawtooth-shaped cross section shown in FIG. 6(b), the intensity ratio of a conjugate diffracted beam cannot be sufficiently obtained. Further, since the blazed hologram 3082 of the conventional example shown in FIGS. 5(a) to 5(f) has a stepwise cross section, it is also a little difficult to increase the intensity ratio of the conjugate diffracted beam. Further, since etching is carried out a plurality of times in the method shown in FIGS. 5(a) to 5(f), a pattern alignment needs a very high accuracy of a few percents of grating pitches (e.g., about 2 micrometers when a grating has pitches of 10 micrometers) and thus a problem arises in that the manufacture thereof is more or less difficult.

In view of the fore-going, another object of the present invention is to provide a method of easily manufacturing a blazed hologram having a cross section near to an ideal sawtooth shape with a pinpoint accuracy. Further, an object of the present invention is to provide an optical head apparatus capable of detecting a signal having a good S/N ratio.

To achieve the above object, according to the present invention, a rectangular cross section is formed by etching, further a masking pattern is formed on a surface, and an ion beam is obliquely irradiated to form a blazed hologram. Further, an optical head apparatus is made using this hologram. More specifically, a method according to the present invention comprises the steps of selectively forming a first masking pattern on a substrate and etching a portion of the substrate using the first masking pattern as a mask; and removing the first masking pattern, forming again a second masking pattern on the substrate, irradiating an ion beam to the surface of the substrate in a direction different from a right angle thereto to thereby selectively etching a portion of the substrate, and forming a sawtooth-shaped surface on the surface thereof. Further, the present invention provides an optical head apparatus using the thus formed hologram.

According to the present invention, since the rectangular cross section is formed by etching and further an ion beam etching is obliquely carried out after the completion of the masking pattern, the accuracy of a pattern alignment is eased, and further since an amount of etching effected by the obliquely irradiated ion beam is small, a cross section nearer to a sawtooth shape can be obtained and thus a difference of the diffraction efficiency of a conjugate diffracted beam can be increased. Then, the present invention can realize an optical head apparatus capable of detecting a signal having a good S/N ratio.

Figure 19A:
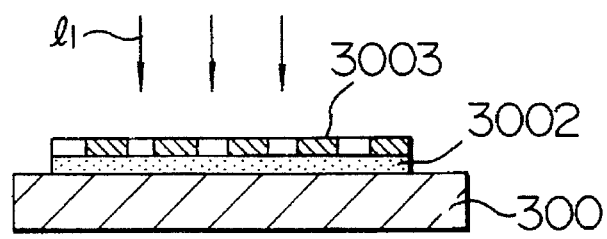
FIGS. 19(a) to 19(g) are sectional views showing a process of manufacturing an optical diffraction element according to the present invention.
Figure 19B:
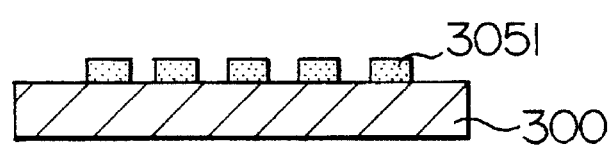
Figure 19C:
Figure 19D:
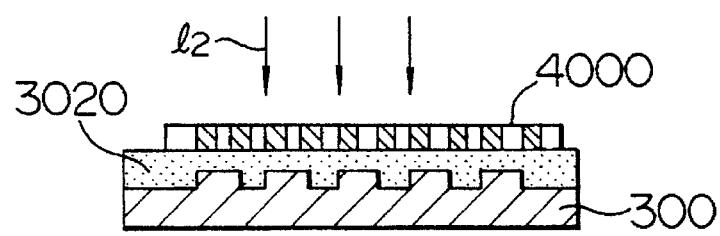
Figure 19E:
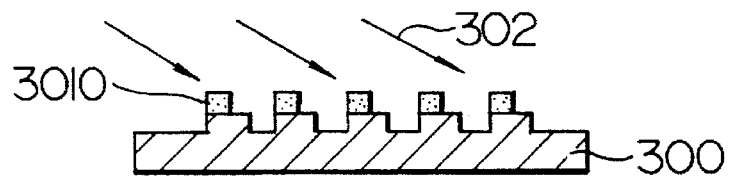
Figure 19F:
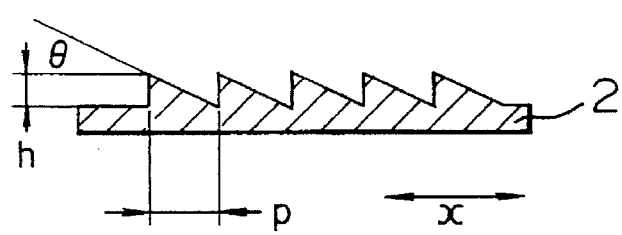

According to the present invention, as shown in FIGS. 19(a) to 19(g), after the completion of the exposure shown in FIG. 19(a) by a beam $l_1$ and the development shown in FIG. 19(b), a rectangular cross section 3001 shown in FIG. 19(c) is made on the surface of a substrate 300 by etching using a masking pattern 3051, and then, as shown in FIGS. 19(d) and 19(e), a masking pattern 3010 is formed again by a resist using a chrome mask 4000 and a beam $l_2$, an ion beam 302 is obliquely irradiated to etch the surface of the substrate 300 to thereby form a blazed hologram 2 having a sawtooth-shaped cross section shown in FIG. 19(f).

Figure 16:
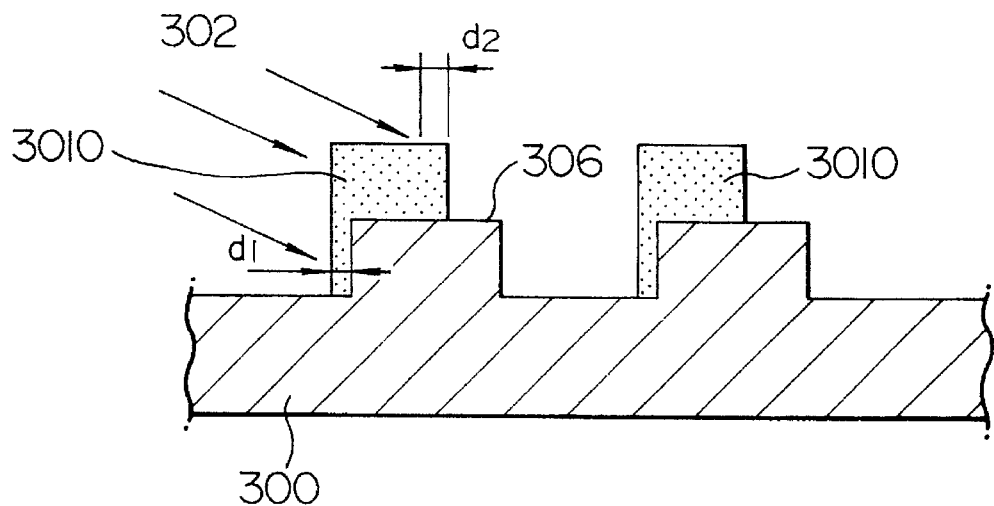
FIG. 16 is an enlarged sectional view illustrating a part of a diffraction element according to the present invention.
Figure 19G:
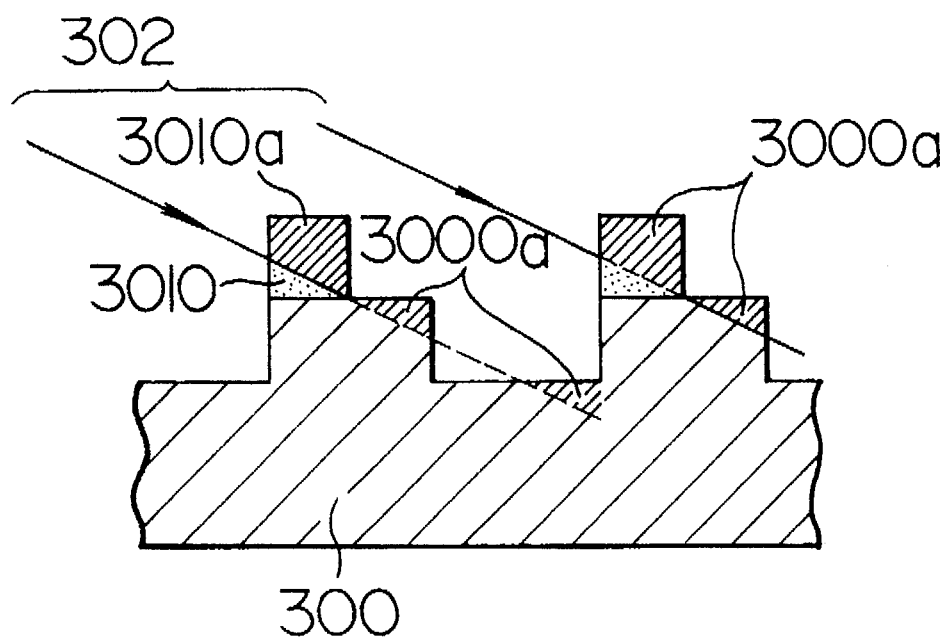

FIG. 19(g) shows a process by which the saw-shaped cross section is formed by the obliquely irradiated ion beam 302. FIG. 19(g) is an enlarged diagram of FIGS. 19(a) to 19(f). In FIG. 19(g), the portions 300a of the substrate 300 is etched by the obliquely irradiated ion beam 302. As the portion 3010a to be etched of the masking pattern 3010 is etched, the portion 3000a to be etched of the substrate is increased and finally the sawtooth-shaped cross section shown in FIG. 19(f) can be obtained. According to the present invention, since the oblique irradiation of the ion beam 302 shown in FIG. 19(e) causes an amount of etching to be reduced as compared with that of the conventional example shown in FIGS. 4(a) to 4(d), an offset from an ideal sawtooth shape is reduced unlike the configurations A and B shown in FIG. 4(d) so that a cross section nearer to the sawtooth shape can be obtained. Further, the masking pattern 3010 of FIG. 19(e) can be made a little wider as shown in FIG. 16. More specifically, as shown in FIG. 16, even if the masking pattern 301 projects from the left edge of the convex portion 306 of the substrate 300 to the left side by $d_1$, the masking pattern 301 does not prevent the formation of the rectangular cross section because it is etched by the ion beam 302. The masking pattern 3010 may be rather positively widened to make the left side of the convex perpendicular. In addition, even if the masking pattern projects from the center line $L_1$ of the convex portion 306 to the right side by $d_2$, the masking pattern also does not hinder the formation of the sawtooth-shaped cross section because the substrate 300 begins to be etched after the projected portion has been etched. As described above, since the method shown in FIGS. 19(c) to 19(g) enables the masking pattern 3010 to be a little widened, the aligning accuracy of the chrome mask 4000 in the exposure in FIG. 19(d) can be eased.

Figure 17:
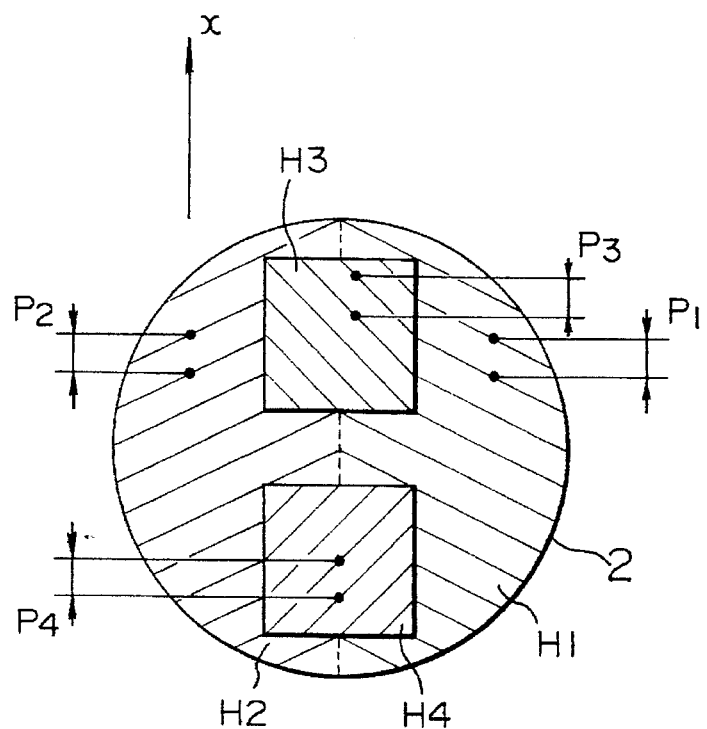
FIG. 17 is a plan view illustrating an example of the optical diffraction element having a blazed hologram.

Next, it is considered that the blazed hologram 2 is used by being split into, for example, regions H1 to H4 shown in FIG. 17. In this case, the sawtooth can be made to a predetermined height [h in FIG. 19(f)] in any portion of the split regions H1 to H4 in such a manner that pitches P1, P2, P3, and P4 in a certain direction (X direction) are made substantially the same as shown in FIG. 17 and when the direction of the incident ion beam 302 is represented by a vector as shown in FIG. 19(e), the direction of the obliquely projected vector to the two surfaces of the blazed hologram 2 is caused to coincide with the X direction. The reason thereof will be described below. A cross-sectional view perpendicular to the surface of the blazed hologram 2 including the vector representing the incident direction of the ion beam 302 is considered as shown in FIGS. 19(e) and 19(f). Since the incident angle of the ion beam 302 to the blazed hologram 2 is a constant, when the sawtooth is observed in this cross-sectional view, the angle of the inclined surface is a constant [θ in FIG. 19(f)]. When the pitch P to the X direction shown in FIGS. 19(f) and 12(a) is made to a constant, h=P tan θ also can be made to a constant. As described above, making h constant enables the phase modulation amplitude of all the split regions (H1 to H4) to be constant, whereby the diffraction efficiency of all the split regions (H1 to H4) is made to be constant. Therefore, it is possible to make the diffraction efficiency of a +1 order diffracted beam substantially 100% in all the split regions (H1 to H4). Further, since the cross section of the hologram made by the manufacturing method of the present invention is very near to a sawtooth shape, it is very easy to increase zero and −1 order diffraction efficiencies and to reduce a −1 order diffraction efficiency. When the hologram is applied to an embodiment of a beam such as an optical pick-up apparatus shown in FIG. 6(b) and the like, the utilization efficiency of the beam is improved and a stray beam produced on a going path by the diffraction made from the blazed hologram 2 can be reduced.

The provision of the blazed hologram having the cross section near to a sawtooth shape enables a difference between the diffraction efficiencies of conjugate diffracted beams to be made larger. Further, an optical head apparatus capable of detecting a signal having a good S/N ratio can be produced by using the blazed hologram.

Note that the utilization efficiency E of a beam used at this time to obtain the signal is given by:

$$E=E_z \times E_{+1} \quad (1)$$

where, $E_z$ and $E_{+1}$ represent the zero and +1 order diffraction efficiencies, respectively. Therefore, $E_z$ and $E_{+1}$ need to be as large as possible to increase the utilization efficiency of a beam for the purpose of improving the S/N ratio of various signals, and thus it is found that the blazed hologram described above in the present invention must be used. Further, when the light beam 36 is incident on the hologram 2, the −1 order diffracted beam 121 is also produced on the going path, and the beam of the −1 order beam on the return path which has been reflected by the optical memory medium 4 and transmitted on the hologram 2 is incident on the photodetector 36 as a stray beam. Since the stray beam lowers the S/N ratio of a detected signal, the diffraction efficiency of the −1 order diffracted beam must be made as small as possible. For this purpose, it is found that the blazed hologram described above in the present invention is effective.

Figure 8A:
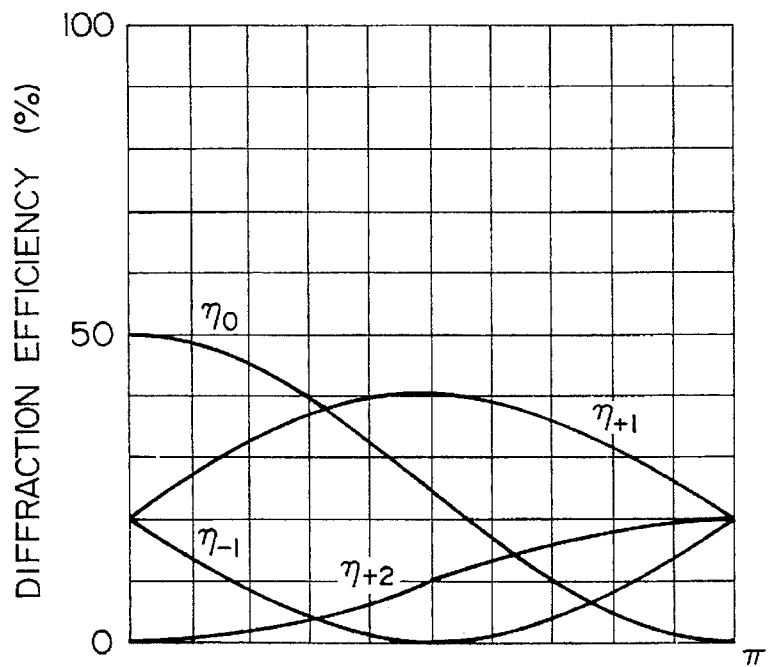
FIGS. 8(a) and 8(b) are views illustrating a result of analysis, in one example form, concerning the beam quantity ratio between stray beam and signal beam.
Figure 8B:
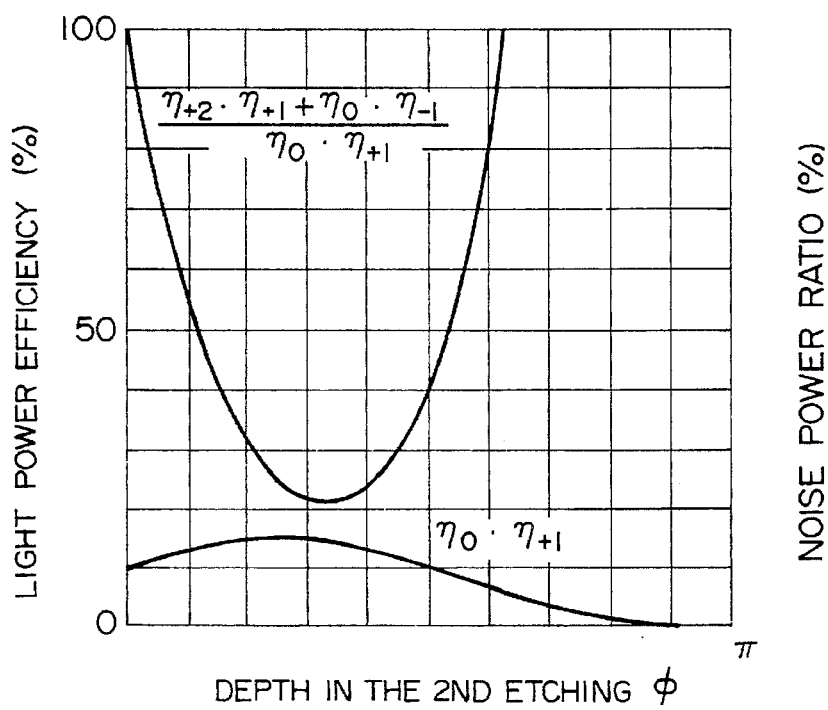

FIG. 8 shows an example analyzing the ratio of the beam quantity of the above stray beam and the signal beam. In this embodiment, a design principle for approximately realizing a blazed hologram by four-level phase steps is given for simplification. More specifically, the diffraction efficiency of a hologram, a beam utilization efficiency on going and return paths $\eta_0 \times \eta_{+1}$, and the ratio of a noise component $(\eta_{+2} \times \eta_{+1} = \eta_0 \times \eta_{-1})$ to a signal beam component $\eta_0 \times \eta_{-1}$ are calculated and plotted, supposing that the depth of a first etching (the difference between steps) corresponds to $\Phi = \pi/2$ in terms of a phase offset amount and using an amount of a second etching (horizontal axis) as a parameter. Supposing that the depth of the second etching is $\Phi = \pi/3$, it is found that the beam utilization efficiency of about 14% and the noise/power ratio of about 20% can be realized.

Figure 9:
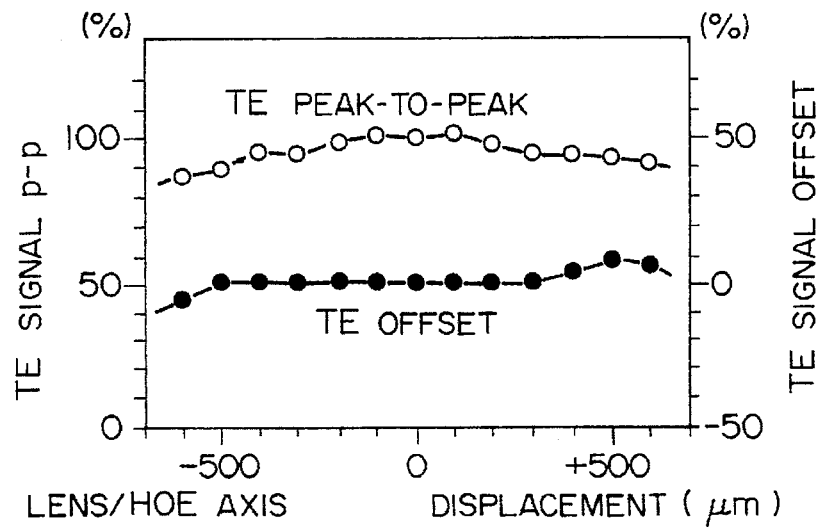
FIG. 9 is a graph showing an example of measured servo characteristics of a SSD system shown in FIG. 6(c)

FIG. 9 shows an example of the result of an experiment obtained by the error signal detection by a SSD system using FE=$(S_3-S_2-S_4)-(S_6-S_5-S_7)$ and the tracking error detection by a slit detection system and TE=$S_1-S_8$ shown in FIG. 6(c) of the embodiment. When observed by a peak-to-peak value, a TE signal maintains about 90% of a maximum value with respect to an offset amount of ±+/−700 micrometers between an objective lens and the optical-axis of a hologram element (objective lens: NA=0.45, conjugate length; about 30 mm) and the offset of the TE signal is within ±10% of a peak value, so that two excellent effects of the present invention have been confirmed.

Note that Table 1 shows the range of tolerance of a mechanical assembly error obtained by a computer simulation by comparing the hologram head (Type H-3) (SSD/slit detection method) shown in FIG. 1(b) with the system of the embodiment of the present invention shown in FIG. 6(c) (Type H-4). In the simulation, an assembly error as the tolerance was determined when a TE signal has a sensitivity lowered to 90% of an maximum value and an offset was 10% of a maximum value. It is found from Table 1 that the latter exhibits a tolerance which is greater than 2 times as large that of the former. Note that in the simulation, the same objective lens (NA=0.45, conjugate length L=30 mm) was used while having h=5.5 mm in Type H-3 and h=22 in Type H-4.

Figure 10:
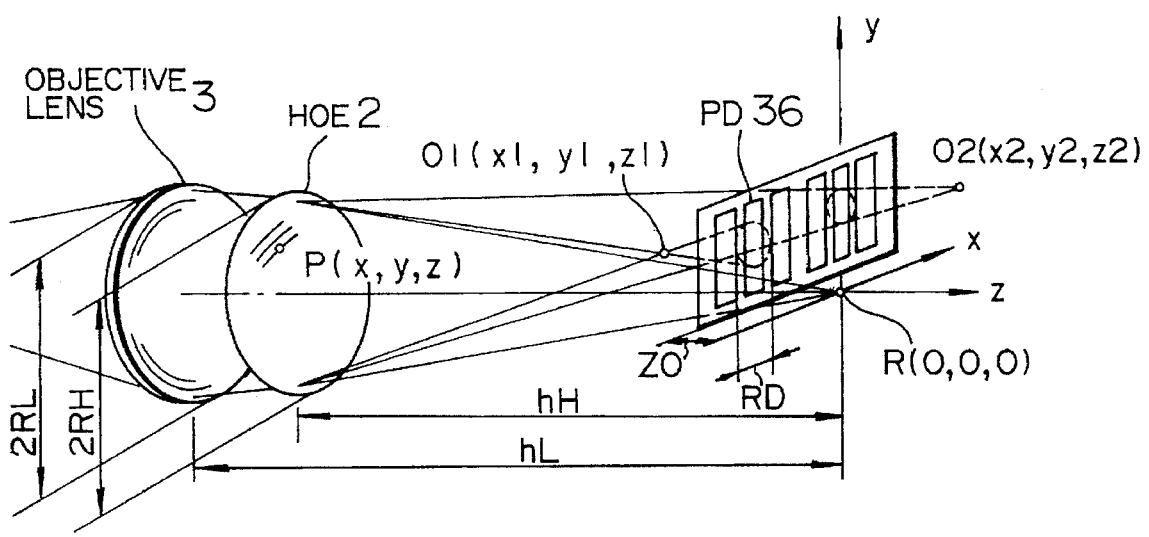
FIG. 10 is a perspective view illustrating an optical system for determining a fringe pattern on the optical diffraction element.

FIG. 10 explains a method of determining the center of a fringe pattern when the holographic element by the SSD method according to the present invention is designed by a computer and shows the positional relationship of the points (x, y, z) of the surface 2 of the hologram element, a reference source R (O, O, O), and an object point $O_1$ ($x_1$, $y_1$, $z_1$), $O_2$ ($x_2$, $y_2$, $z_2$). Supposing that a wavelength is $\lambda$, the expression of a Fresnel zone plates with respect to $O_1$, $O_2$ is given by:

$$K=[(x-x_i)^2+(y-y_i)^2+(z-z_i)^2]^{1/2}-(x_2+y_2+z_2)^{1/2}$$

where, i=1,2.

Figure 13:
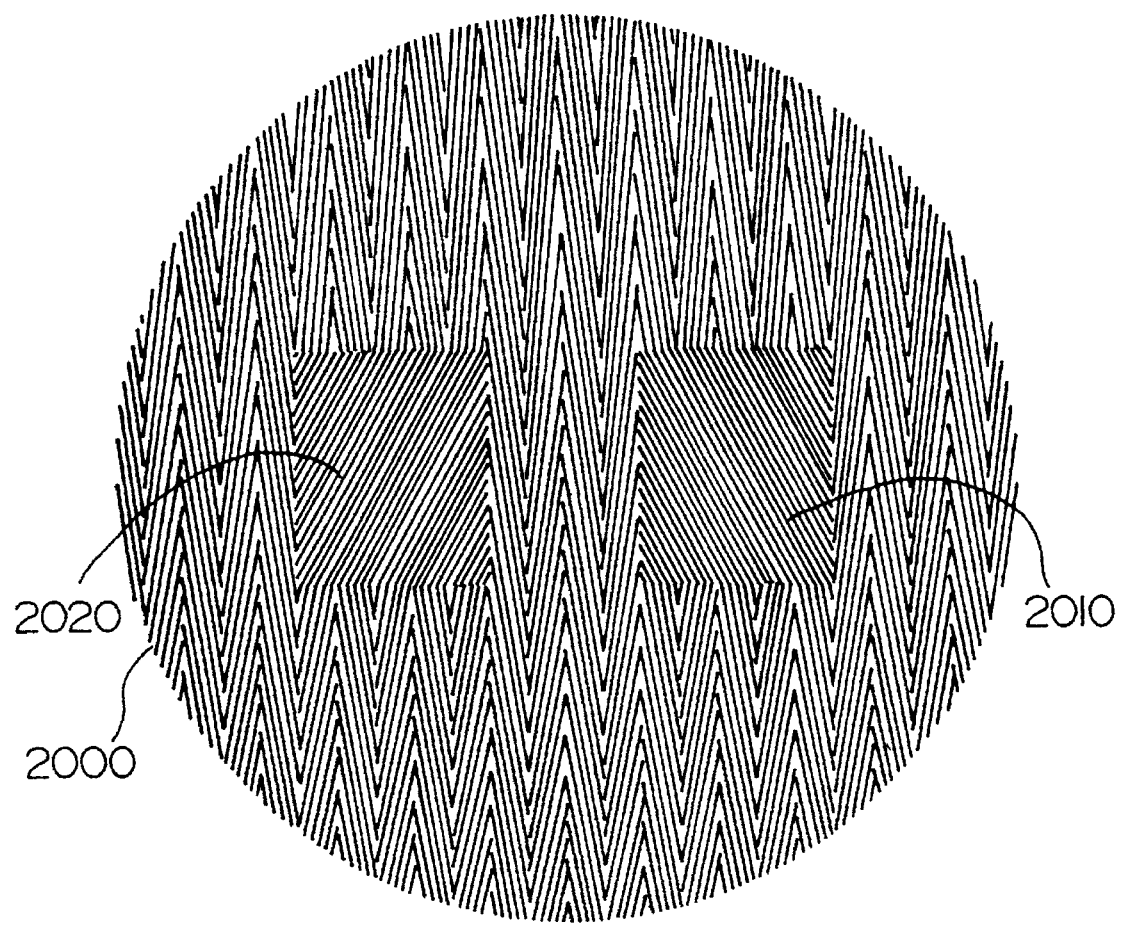
FIG. 13 is a plan view showing a mask pattern for fabricating a diffraction element.

FIG. 13 shows an example of a mask pattern drawn by a computer, wherein $\lambda$=780 nm×2. (2010 and 2020 represent slit regions for detecting a tacking signal.) Further, the case in which the surface of a hologram is inclined with respect to the optical-axis of a lens can be easily determined by a simple consideration. As an example, a hologram pattern having a trapezoidal opening as shown in FIG. 18(b) can be synthesized by a computer to an optical head apparatus using a reflection type hologram element 2000 shown in FIG. 18(a) as another embodiment of the present invention.

Figure 3:
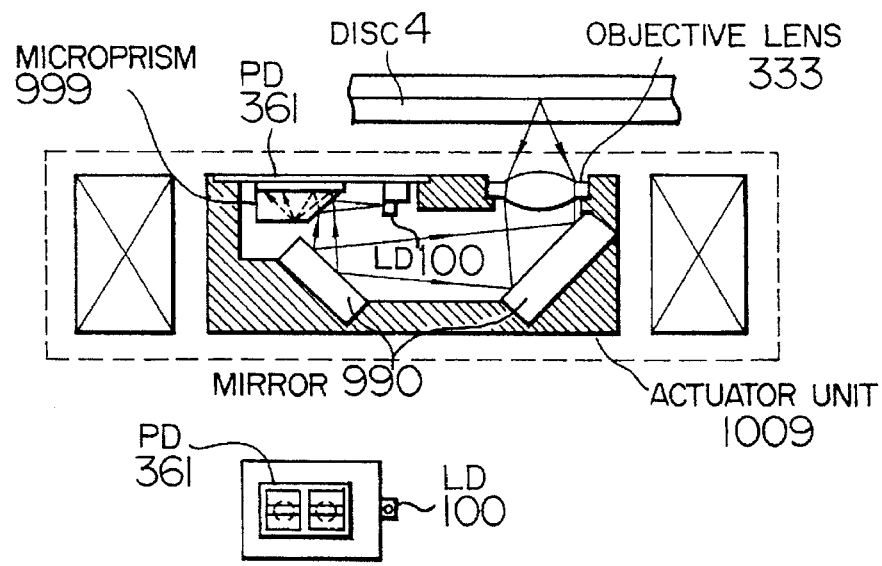
FIG. 3 is a sectional view illustrating the optical head apparatus shown in FIG. 2(a)
Figure 18A:
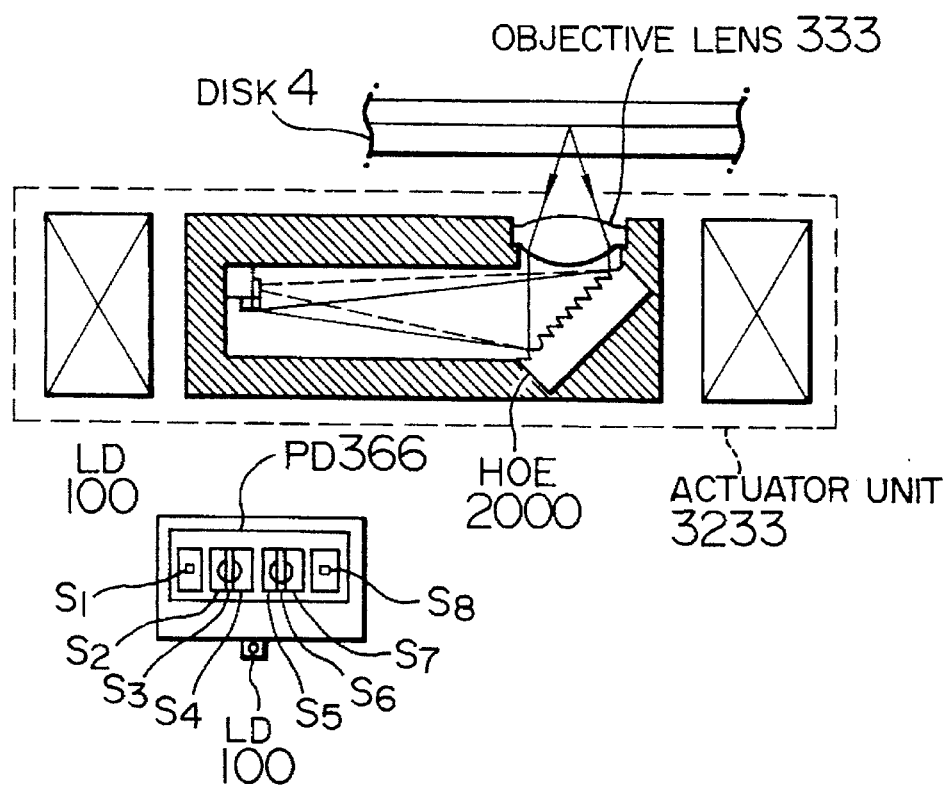
FIG. 18(a) is a sectional view illustrating the another embodiment of an optical head apparatus according to the present invention.

The embodiment of the present invention shown in FIG. 18(a) is an optical system simpler than an integrated optical system constituting the SSD system using a micro prism 999 shown in FIG. 3 (Japanese Patent Unexamined No. 1-118224 filed by Sony) and further has a higher freedom of design. The optical head apparatus of this embodiment is different from the previous embodiment in that not only a laser source 100 is integrated with a photodetector 36 but also the entire optical system is fixed on the optical-axis of a lens 333 for integration. With this arrangement, the conditions, under which the off-axis aberration of the aspherical lens 333 is caused, are restrained to thereby realize the micro objective lens 333 having a short conjugate length, and thus the entire optical system can be easily accommodated in an actuator. As a design example, an asperical lens having a conjugate length of 10 mm could be realized with the weight of the entire optical system including a lens barrel of 1 g.

Figure 18B:
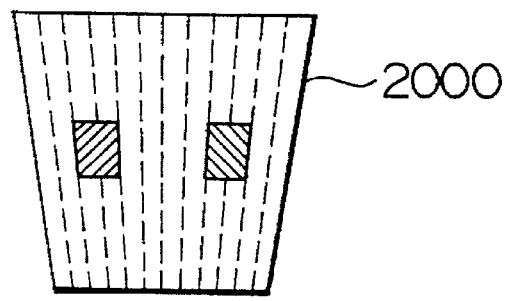
FIG. 18(b) is a plan view illustrating a hologram pattern used in the optical head apparatus shown in FIG. 18(a)

A hologram element 2000 shown in FIG. 18(b) explains that the opening in the reflection hologram used in the arrangement in FIG. 18(a) is vertically asymmetric and optimized. Referring to FIG. 10, the method of designing the hologram element in this case is similar to that of a transmission type one, except that the hologram surface (x, y, z) thereof is inclined by about 45° with respect to an optical-axis z.

A great effect to the circumference-resistant performance such as dust resistance, moisture resistance and the like can be expected from the entire optical system accommodated in the sealed container.

TABLE 1

Calculated tolerances with tracking servo performance under displacements of respective elements to each direction

| Optical elements | Direction | Type H-3 Head | | Type H-4 Head | |
|---|---|---|---|---|---|
| | | Sensitivity | Offset | Sensitivity | Offset |
| Lens | Radial | ±350 | ±350 | ±980 | >1000 |
| HOE | Tangential | ±270 | Don't care | ±700 | Don't care |
| | Radial | ±120 | ±100 | ±370 | +370 |
| | Lens | ±260 | Don't care | ±900 | Don't care |

What we claim is:

1. A movable optical pick-up head apparatus of integrated lens and hologram type, comprising:

a light radiation source;

an imaging optics means having an optical axis;

a hologram element including a diffraction optical element on which two different kinds of blazed patterns are formed alternately in an even number, greater than or equal to four, of regions which are arranged in parallel with one another so as to be successively adjacent to one another but which do not overlap with one another, for producing a zero order diffraction component beam from a beam emitted from said light radiation source, said imaging optics means receiving said zero order diffraction component beam so as to converge said zero order diffraction component beam into a spot on a memory medium and further receiving a reflected beam from the spot, and for producing a pair of first order diffraction component beams having focused points which have different distances from said hologram element along said optical axis, from said reflected beam transmitted from said imaging optic means, said first order diffraction component beams being deflected from said optical axis of said imaging optics means;

at least one pair of optical detection means having beam receiving surfaces which are located on a single plane which is disposed between said focused points, said plane being orthogonal to said optical axis, said pair of first order diffraction component beams impinging on respective ones of said beam receiving surfaces of said at least one pair of optical detection means with spot sizes which are substantially equal to each other if said imaging optics means focuses said zero order diffraction component beam into said spot on said memory medium, for differentially obtaining a focusing error signal corresponding to a difference between said spot sizes of said pair of first order diffraction component beams on said beam receiving surfaces of said at least one pair of optical detection means when said imaging optics means does not focus said zero order diffraction component beam into said spot on said memory medium; and an actuator means for driving said imaging optics means in accordance with said focusing error signal from said optical detection means so as to allow said imaging optics means to focus said zero order diffraction component beam into said spot on said memory medium so that said spot can scan precisely said memory medium.

2. A movable optical pick-up head apparatus as set forth in claim 1, wherein said light radiation source and said at least one pair of optical detection means are disposed on a common substrate.

3. A movable optical pick-up head apparatus as set forth in claim 1, wherein said blazed patterns are Fresnel lens patterns.

4. A movable optical pick-up head apparatus as set forth in claim 1, wherein said blazed patterns are grating patterns.

5. A movable optical pick-up head apparatus as set forth in claim 1, wherein said blazed patterns are of stepped shapes.

6. A movable optical pick-up head apparatus as set forth in claim 1, wherein said imaging optics means and said hologram element are integrally incorporated with each other in one unit body.

7. A movable optical pick-up head apparatus as set forth in claim 1, wherein said even number of regions are separated by boundaries extending in a first direction and are disposed alternately along a second direction different from said first direction.

8. A moveable optical pick-up head apparatus as set forth in claim 1, wherein each of said even number of regions has a different width.

9. A movable optical pick-up head apparatus of integrated lens and hologram type, comprising:

a light radiation source;

an imaging optics means having an optical axis;

a hologram element including a diffraction optical element on which two different Fresnel patterns are blazed alternately on an even number, greater than or equal to four, of zones which are arranged in parallel with one another so as to be successively adjacent to one another but which do not overlap with one another, for producing a zero order diffraction component beam from a beam which is received from said light radiation source, said imaging optics means converging said zero order diffraction component beam into a spot on a memory medium, and receiving a reflected beam from said spot, and for producing a pair of first order diffraction component beams having focused points which have different distances from said hologram element along said optical axis, from the reflected beam received from said spot on the memory medium by way of said imaging optics means, said pair of first order diffraction component beams being deflected from said optical axis of said imaging optics means by said hologram element;

at least one pair of optical detection means having beam receiving surfaces which are located on a single plane which is disposed between said focused points, said plane being orthogonal to said optical axis, said pair of first order diffraction component beams impinging on respective ones of said beam receiving surfaces of said at least one pair of optical detection means with spot sizes which are substantially equal to each other if said imaging optics means focuses said zero order diffraction component beam into said spot on said memory medium, for differentially obtaining a focusing error signal corresponding to a difference between said spot sizes of said pair of first order diffraction component beams on said beam receiving surfaces of said at least one pair of optical detection means when said imaging optics means does not focus said zero order diffraction component beam into said spot on said memory medium;

a frame means for incorporating said light radiation sources, said imaging optics means, said hologram element and said at least one pair of optical detection means; and an actuator for driving said frame means in accordance with said focusing error signal so as to allow said imaging optics means to focus said zero order diffraction component beam into said spot on said memory medium so that said spot can scan precisely said memory medium.

10. A movable optical pick-up head apparatus as set forth in claim 9, wherein said blazed pattern has a stepped shape.

11. A movable optical pick-up head apparatus as set forth in claim 9, wherein said light radiation source and said at least one pair of optical detection means are disposed on a common substrate in said frame means.

12. A movable optical pick-up head apparatus as set forth in claim 9, wherein said even number of zones are separated by boundaries extending in a first direction and are disposed alternately along a second direction different from said first direction.

13. A moveable optical pick-up head apparatus as set forth in claim 9, wherein each of said even number of zones has a different width.

14. A movable optical pick-up head apparatus of integrated lens and hologram type, comprising:

a light radiation source;

an imaging optics means having an optical axis;

a hologram element including a diffraction optical element on which two different Fresnel patterns are blazed so as to be quantized by more than four levels, alternately in a plurality of zones which are arranged in parallel with one another so as to be successively adjacent to one another but which do not overlap with one another, for producing a zero order diffraction component beam from a beam which is received from said light radiation source, said imaging optics means converging said zero order diffraction component beam into a spot on a memory medium, and receiving a reflected beams from said spot, and for producing a pair of first order diffraction component beams having different focused points from said reflected beam received from said spot on the memory medium by way of said imaging optics means, said first order diffraction component beams being deflected from said optical axis of said optics means by said hologram element;

at least one pair of optical detection means on which said pair of first order diffraction component beams are made incident to form spots having spot sizes, respectively, for differentially obtaining a focusing error signal and a tracking error signal, corresponding to a difference between said spot sizes of said spots formed from said pair of first order diffraction component beams on said at least one pair of optical detection means when said imaging optics means does not focus said zero order component beam on said memory medium;

a frame means for integrally enclosing said light radiation sources, said imaging optics means, said hologram element and said at least one pair of optical detection means; and an actuator for driving said frame means in accordance with said focusing error signal from said optical detection means so as to allow said imaging optics means to converge said zero order component beam into a focused spot on said memory medium, whereby said focused spot can scan precisely said memory medium.

15. A movable optical pick-up head apparatus as set forth in claim 14, wherein each of said at least one pair of optical detection means has a plurality of split zones receiving said pair of first order diffraction component beams so as to deliver a signal corresponding to a quantity of light received on each of said plurality of split zones.

16. A movable optical pick-up head apparatus as set forth in claim 15, wherein said at least one pair of optical detection means produce a servo signal and an RF signal.

* * * * *